US009515787B2

(12) United States Patent
Ratasuk et al.

(10) Patent No.: US 9,515,787 B2
(45) Date of Patent: Dec. 6, 2016

(54) WIRELESS COMMUNICATION SCHEDULING ON SHARED SPECTRA

(71) Applicant: Nokia Solutions and Networks Oy, Espoo (FI)

(72) Inventors: Rapeepat Ratasuk, Hoffman Estates, IL (US); Mikko Aleksi Uusitalo, Helsinki (FI); Antti Sorri, Helsinki (FI); Nitin Mangalvedhe, Hoffman Estates, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 18 days.

(21) Appl. No.: 14/400,347

(22) PCT Filed: May 13, 2013

(86) PCT No.: PCT/EP2013/059782
§ 371 (c)(1),
(2) Date: Nov. 11, 2014

(87) PCT Pub. No.: WO2013/167748
PCT Pub. Date: Nov. 14, 2013

(65) Prior Publication Data
US 2015/0139175 A1      May 21, 2015

Related U.S. Application Data

(60) Provisional application No. 61/645,880, filed on May 11, 2012.

(51) Int. Cl.
*H04L 1/00*      (2006.01)
*H04L 5/00*      (2006.01)
*H04W 72/04*     (2009.01)

(52) U.S. Cl.
CPC ........... *H04L 5/0007* (2013.01); *H04L 5/0051* (2013.01); *H04W 72/042* (2013.01); *H04L 5/0094* (2013.01)

(58) Field of Classification Search
CPC ................... H04W 72/0446; H04W 72/0447; H04W 72/0448; H04W 72/04; H04W 72/05; H04W 72/06; H04L 47/10; H04L 47/11; H04L 47/12; H04L 47/13
(Continued)

(56) References Cited

U.S. PATENT DOCUMENTS 9,084,260 B2 *   7/2015   Maltsev ............ H04W 72/0453
2013/0165134 A1* 6/2013   Touag ............... H04W 72/0486
                                              455/452.1
2013/0195073 A1* 8/2013   Chen ..................... H04L 5/0023
                                              370/331

FOREIGN PATENT DOCUMENTS

EP     2 400 802 A1    12/2011
GB     2 477 649 A     8/2011

OTHER PUBLICATIONS

3GPP TR36.913 V8.0.1 (Mar. 2009), "3rd Generation Partnership Project; Technical Specification Group Radio Access Network; Requirements for further advancements for Evolved Universal Terrestrial Radio Access (E-UTRA) (LTE-Advanced) (Release 8)", 15 pgs.
(Continued)

*Primary Examiner* — Dady Chery
(74) *Attorney, Agent, or Firm* — Harrington & Smith

(57) ABSTRACT

A method includes scheduling, by a base station configured to service a cell within a cellular communication network, multiple grants to an apparatus in a coverage area of the cell. Each of the scheduled multiple grants includes time-frequency resources in at least one shared spectrum that is to be used by the apparatus to attempt to communicate. Each of
(Continued)

the scheduled multiple grants differs from others of the scheduled multiple grants in one or both of time or frequency. The method includes sending indications of the scheduled multiple grants. Another method includes receiving, at the apparatus in the cell, indications of the multiple grants and attempting by the apparatus to communicate using one or more of the multiple grants. Apparatus, computer programs, and program products are also disclosed.

25 Claims, 13 Drawing Sheets

(58) Field of Classification Search
USPC .................. 370/229, 230, 235, 329, 330
See application file for complete search history.

(56) References Cited

OTHER PUBLICATIONS

3GPP TR36.913 V9.0.0 (Dec. 2009), "3rd 1 Generation Partnership Project; Technical Specification Group Radio Access Network; Requirements for further advancements for Evolved Universal Terrestrial Radio Access (E-UTRA) (LTE-Advanced) (Release 9)", 15 pgs.

3GPP TR36.913 V10.0.0 (Mar. 2011), "3rd Generation Partnership Project; Technical Specification Group Radio Access Network; Requirements for further advancements for Evolved Universal Terrestrial Radio Access (E-UTRA) (LTE-Advanced) (Release 10)", 15 pgs.

3GPP TS36.300 V8.12.0 (Mar. 2010), "3rd Generation Partnership Project; Technical Specification Group Radio Access Network; Evolved Universal Terrestrial Radio Access (E-UTRA) and Evolved Universal Terrestrial Radio Access Network (E-UTRAN); overall description; Stage 2 (Release 8)", 149 pgs.

3GPP TS36.300 V9.7.0 (Mar. 2011), "3rd Generation Partnership Project; Technical Specification Group Radio Access Network; Evolved Universal Terrestrial Radio Access (E-UTRA) and Evolved Universal Terrestrial Radio Access Network (E-UTRAN); overall description; Stage 2 (Release 9)", 174 pgs.

3GPP TS36.300 V10.4.0 (Jun. 2011), "3rd Generation Partnership Project; Technical Specification Group Radio Access Network; Evolved Universal Terrestrial Radio Access (E-UTRA) and Evolved Universal Terrestrial Radio Access Network (E-UTRAN); overall description; Stage 2 (Release 10)", 194 pgs.

3GPP TS36.211 V10.4.0 (Dec. 2011), "3rd Generation Partnership Project; Technical Specification Group radio Access Network; Evolved Universal Terrestrial Radio Access (E-UTRA); Physical Channels and Modulation (Release 10)", 101 pgs.

Mai-Anh Phan, "Carrier Aggregation Concepts for LTE-REL-10", © Ericsson AB 2010, 14 pgs.

* cited by examiner

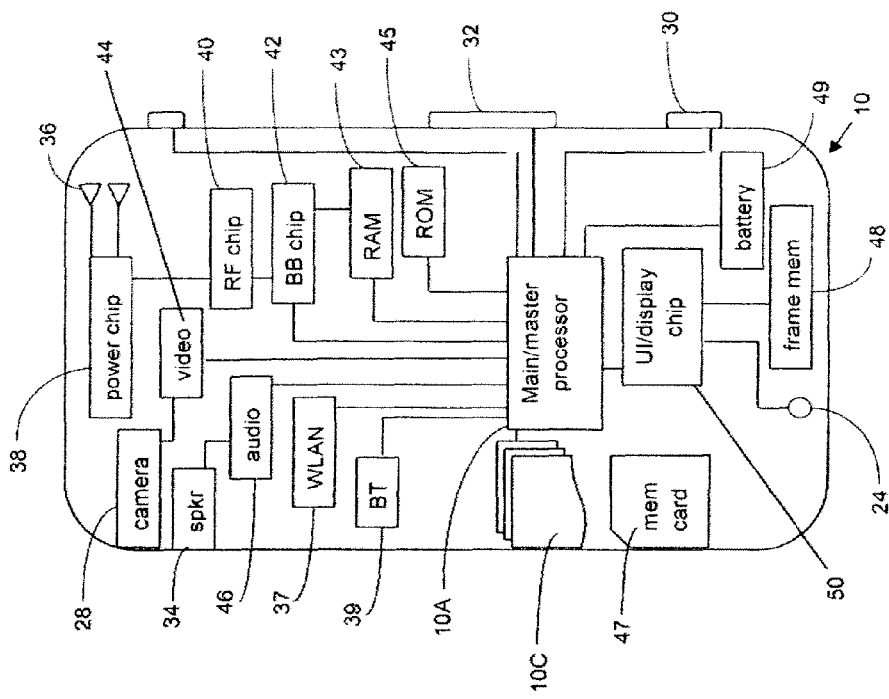
FIG. 2B
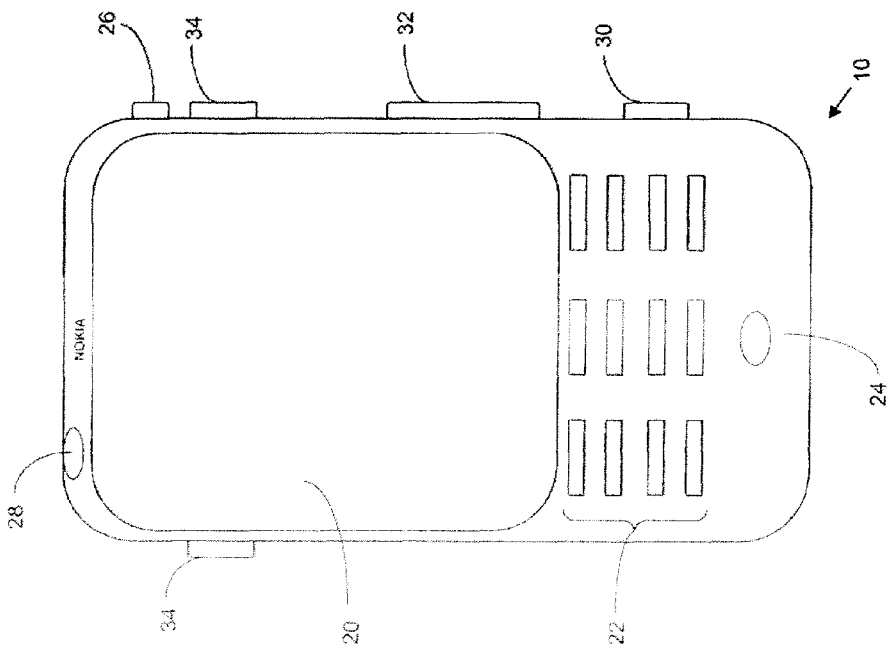

WIRELESS COMMUNICATION SCHEDULING ON SHARED SPECTRA

CROSS-REFERENCE TO RELATED APPLICATIONS

This is a national stage application under 35 U.S.C. 371, of International Application Number PCT/EP2013/059782, filed on May 13, 2013, which claims priority from U.S. provisional application No. 61/645,880, filed on May 11, 2012.

TECHNICAL FIELD

The exemplary and non-limiting embodiments of this invention relate generally to wireless communication systems, apparatus, methods and computer program products and, more specifically, relate to scheduling for shared spectra.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section. Abbreviations used in this document and/or the figures are presented below prior to the claims.

The specification of a communication system known as evolved UTRAN (E-UTRAN, also referred to as UTRAN-LTE or as E-UTRA) is currently nearing completion within the 3GPP. As specified the DL access technique is OFDMA, and the uplink access technique is SC-FDMA.

One specification of interest is 3GPP TS 36.300, V8.12.0 (2010 04), "3rd Generation Partnership Project; Technical Specification Group Radio Access Network; Evolved Universal Terrestrial Radio Access (E UTRA) and Evolved Universal Terrestrial Access Network (E UTRAN); Overall description; Stage 2 (Release 8)." This system may be referred to for convenience as LTE Rel-8 (which also contains 3G HSPA and its improvements). In general, the set of specifications given generally as 3GPP TS 36.xyz (e.g., 36.211, 36.311, 36.312, etc.) may be seen as describing the Release 8 LTE system. Release 9 versions of these specifications have been published, including 3GPP TS 36.300, V9.7.0 (2011-3). Release 10 versions of these specifications have been published, including 3GPP TS 36.300, V10.4.0 (2011-06).

FIG. 1 reproduces FIG. 4-1 of 3GPP TS 36.300 V8.12.0, and shows the overall architecture of the E UTRAN system 2 (Rel-8). The E-UTRAN system 2 includes eNBs 3, providing the E-UTRAN user plane (PDCP/RLC/MAC/PHY) and control plane (RRC) protocol terminations towards the UE (not shown). The eNBs 3 are interconnected with each other by means of an X2 interface. The eNBs 3 are also connected by means of an S1 interface to an EPC, more specifically to a MME by means of a S1 MME interface and to a S-GW by means of a S1 interface (MME/S-GW 4). The S1 interface supports a many-to-many relationship between MMES/S-GWs and eNBs.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Of particular interest herein are the further releases of 3GPP LTE (e.g., LTE Rel-10) targeted towards future IMT A systems, referred to herein for convenience simply as LTE-Advanced (LTE A). Reference in this regard may be made to 3GPP TR 36.913, V8.0.1 (2009 03), 3rd Generation Partnership Project; Technical Specification Group Radio Access Network; Requirements for Further Advancements for E UTRA (LTE-Advanced) (Release 8). A goal of LTE-A is to provide significantly enhanced services by means of higher data rates and lower latency with reduced cost. LTE-A is directed toward extending and optimizing the 3GPP LTE Rel-8 radio access technologies to provide higher data rates at very low cost. LTE-A is part of LTE beyond Rel-10. LTE-A is a more optimized radio system fulfilling the ITU-R requirements for IMT-A while maintaining backward compatibility with LTE Rel-8. Reference is further made to a Release 9 version of 3GPP TR 36.913, V9.0.0 (2009-12). Reference is also made to a Release 10 version of 3GPP TR 36.913, V10.0.0 (2011-06).

As is specified in 3GPP TR 36.913, LTE-A should operate in spectrum allocations of different sizes, including wider spectrum allocations than those of Rel-8 LTE (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation, where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel 8.

A terminal may simultaneously receive one or multiple component carriers depending on its capabilities. A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

FIG. 1B shows an example of the carrier aggregation, where M Rel-8 component carriers are combined together to form M×Rel-8 BW (e.g., 5×20 MHz=100 MHz given M=5). Rel-8 terminals receive/transmit on one component carrier, whereas LTE-A terminals may receive/transmit on multiple component carriers simultaneously to achieve higher (wider) bandwidths.

With further regard to carrier aggregation, what is implied is that one eNB can effectively contain more than one cell on more than one CC (frequency carrier), and the eNB can utilize one (as in E-UTRAN Rel-8) or more cells (in an aggregated manner) when assigning resources and scheduling the UE.

LTE is currently deployed in licensed bands where the spectrum is exclusively reserved. However, the amount of available spectrum is limited and the cost to obtain new spectrum allocations/reservations can be prohibitive. In LANs (e.g., WLANs), WiFi is often deployed to offload some traffic from the overlay LTE systems. This provides opportunities for operators to cope with increased traffic.

SUMMARY

This section contains examples of possible implementations and is not meant to be limiting.

An exemplary embodiment is a method. The method includes scheduling, by a base station configured to service a cell within a cellular communication network, multiple grants to an apparatus in a coverage area of the cell. Each of the scheduled multiple grants comprises time-frequency resources in at least one shared spectrum that is to be used by the apparatus to attempt to communicate. Each of the scheduled multiple grants differs from others of the scheduled multiple grants in one or both of time or frequency. The method includes sending by the base station to the apparatus indications of the scheduled multiple grants.

Another exemplary embodiment is an apparatus. The apparatus comprises: means for scheduling, by a base station configured to service a cell within a cellular communication network, multiple grants to an apparatus in a coverage area of the cell, where each of the scheduled multiple grants comprises time-frequency resources in at least one shared spectrum that is to be used by the apparatus to attempt to communicate, where each of the scheduled multiple grants differs from others of the scheduled multiple grants in one or both of time or frequency; and means for sending by the base station to the apparatus indications of the scheduled multiple grants.

An additional exemplary embodiment includes a computer program, comprising code for scheduling, by a base station configured to service a cell within a cellular communication network, multiple grants to an apparatus in a coverage area of the cell, where each of the scheduled multiple grants comprises time-frequency resources in at least one shared spectrum that is to be used by the apparatus to attempt to communicate, where each of the scheduled multiple grants differs from others of the scheduled multiple grants in one or both of time or frequency; and code for sending by the base station to the apparatus indications of the scheduled multiple grants, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: scheduling, by a base station configured to service a cell within a cellular communication network, multiple grants to an apparatus in a coverage area of the cell, where each of the scheduled multiple grants comprises time-frequency resources in at least one shared spectrum that is to be used by the apparatus to attempt to communicate, where each of the scheduled multiple grants differs from others of the scheduled multiple grants in one or both of time or frequency; and sending by the base station to the apparatus indications of the scheduled multiple grants.

An exemplary computer program product includes a computer-readable storage medium bearing computer program code embodied therein for use with a computer. The computer program code includes: code for scheduling, by a base station configured to service a cell within a cellular communication network, multiple grants to an apparatus in a coverage area of the cell, where each of the scheduled multiple grants comprises time-frequency resources in at least one shared spectrum that is to be used by the apparatus to attempt to communicate, where each of the scheduled multiple grants differs from others of the scheduled multiple grants in one or both of time or frequency; and code for sending by the base station to the apparatus indications of the scheduled multiple grants.

A further exemplary embodiment is a method. The method includes receiving, at an apparatus in a cell of a cellular communication network and from a base station serving the cell, indications of multiple grants. Each of the multiple grants comprises time-frequency resources in at least one shared spectrum that is to be used by the apparatus to attempt to communicate. Each of the multiple grants differs from others of the multiple grants in one or both of time or frequency. The method includes attempting by the apparatus to communicate using one or more of the multiple grants.

An additional exemplary embodiment includes a computer program, comprising code for receiving, at an apparatus in a cell of a cellular communication network and from a base station serving the cell, indications of multiple grants, where each of the multiple grants comprises time-frequency resources in at least one shared spectrum that is to be used by the apparatus to attempt to communicate, where each of the multiple grants differs from others of the multiple grants in one or both of time or frequency; and code for attempting by the apparatus to communicate using one or more of the multiple grants, when the computer program is run on a processor. The computer program according to this paragraph, wherein the computer program is a computer program product comprising a computer-readable medium bearing computer program code embodied therein for use with a computer.

Another exemplary embodiment is an apparatus comprising: means for receiving, at an apparatus in a cell of a cellular communication network and from a base station serving the cell, indications of multiple grants, where each of the multiple grants comprises time-frequency resources in at least one shared spectrum that is to be used by the apparatus to attempt to communicate, where each of the multiple grants differs from others of the multiple grants in one or both of time or frequency; and means for attempting by the apparatus to communicate using one or more of the multiple grants.

An exemplary apparatus includes one or more processors and one or more memories including computer program code. The one or more memories and the computer program code are configured to, with the one or more processors, cause the apparatus to perform at least the following: receiving, at an apparatus in a cell of a cellular communication network and from a base station serving the cell, indications of multiple grants, where each of the multiple grants comprises time-frequency resources in at least one shared spectrum that is to be used by the apparatus to attempt to communicate, where each of the multiple grants differs from others of the multiple grants in one or both of time or frequency; and attempting by the apparatus to communicate using one or more of the multiple grants.

An exemplary computer program product includes a computer-readable storage medium bearing computer program code embodied therein for use with a computer. The computer program code includes: code for receiving, at an apparatus in a cell of a cellular communication network and from a base station serving the cell, indications of multiple grants, where each of the multiple grants comprises time-frequency resources in at least one shared spectrum that is to be used by the apparatus to attempt to communicate, where each of the multiple grants differs from others of the multiple grants in one or both of time or frequency; and code for attempting by the apparatus to communicate using one or more of the multiple grants.

BRIEF DESCRIPTION OF THE DRAWINGS

In the attached Drawing Figures:
FIG. 2B shows a more particularized block diagram of an exemplary user equipment such as that shown in FIG. 2A.

DETAILED DESCRIPTION OF THE DRAWINGS

Figure 1A:
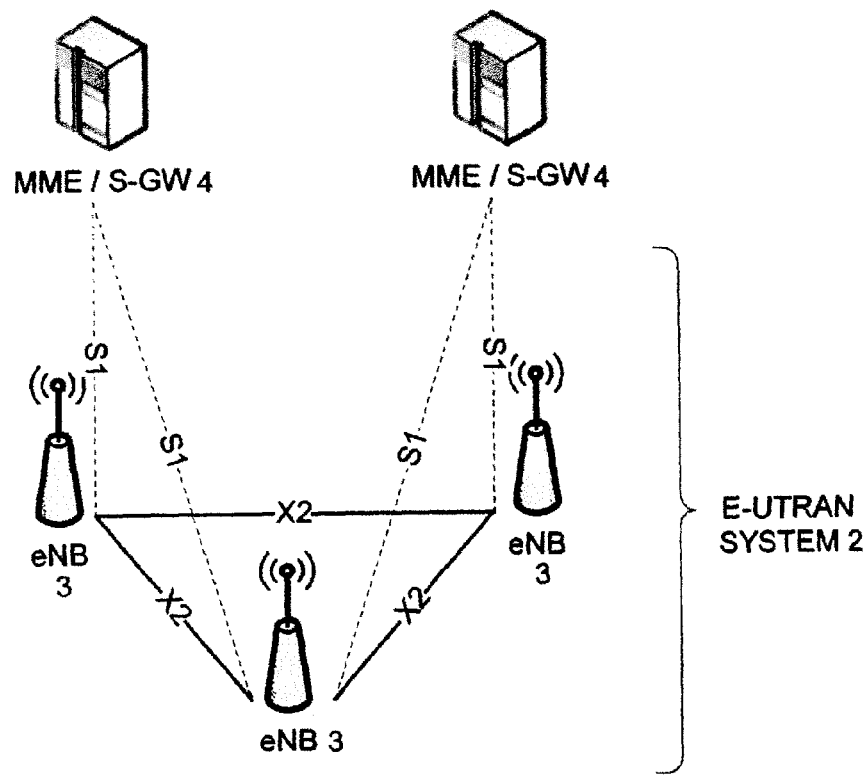
FIG. 1A reproduces FIG. 4-1 of 3GPP TS 36.300 V8.12.0, and shows the overall architecture of the E UTRAN system.

As another alternative, LTE can be modified to use shared spectra such as license exempt bands. Shared means shared among different operators and users. Licensed means exclusive use by one operator but the spectrum is still shared among the different users. One approach is to use license exempt frequencies (bands), when available, for LTE operation in order to increase the capacity of a LTE network. From a spectrum point of view, LTE has more efficient spectrum usage than WLAN. Shared spectra refer to bands that are license exempt bands (i.e., unlicensed or lightly-licensed), and also include secondary-usage of licensed bands or other ways for several actors to share usage of spectrum. A primary user of a licensed band has higher level of rights for the spectrum. In general, if a user with primary rights is not using spectrum, then a secondary user can use the spectrum. The other ways can include even lower priority than secondary like tertiary use, allowing usage when secondary users are not using the spectrum. Shared spectrum use can also consist of co-primary usage, when there are multiple actors with primary usage rights and they are sharing the spectrum.

A spectrum access authorization scheme without the need of exclusive license is the so called light-licensing scheme. This refers to a simplified procedure of issuing authorizations for use of spectrum (compared to full-blown licenses). Both individual and general authorizations can be issued under a light licensing regime. Light-licensing is typically applied in situations where there is no or little immediate concern about interference, but where it is desirable to perform a (typically lightweight) check if the planned usage is likely to cause problems to other already existing usages (cf the light licensing scheme used in e.g. the UK for Broadband Wireless Access in the 5.8 GHz band), or where there may be a need to make changes to the use of the spectrum in the future so that there is a need to maintain a record of spectrum users.

Among the envisioned future spectrum sharing schemes, the ones that are most suitable for light-licensing sharing scenarios are (noting that those schemes may also combined with other licensing schemes) the following:

Spectrum pooling: In spectrum pooling, the NRA (National Regulatory Authority) refrains from partitioning the band into blocks/sub-bands and instead issues authorizations to several operators that allow them to access the band. An issued license is equivalent to an entrance ticket to a shared spectrum pool. The band is thus shared among a limited number of operators in some way, e.g. in time, in space, and/or in frequency. The pooling rules (i.e., the rules according to which resources are distributed among licensees inside the spectrum pool) and the number of licenses is a priori known. This ensures that some level of predictability for the achievable capacity and return of investment is provided to sharing parties.

Mutual Renting: A band is subdivided into a number of licensed blocks which are "owned" by one operator, but unused resources from owned licensed blocks can be "rented" to other block owners. This situation allows for operators to mutually allow other operators to "rent" parts of their licensed spectrum or resource block. An operator may rent spectrum from multiple operators simultaneously. A block owner has pre-emptive priority to access an owned block (this can be subject to agreements between parties). This implies that the owner of the block is assumed to always have strict priority in accessing its licensed spectrum, including the possibility of pre-emption at any time. This approach opens up for more dynamic use of the spectrum and allows an operator an additional source of income from its temporarily unused spectrum.

Future deployments of LTE in license exempt bands may be part of a carrier aggregation type system with multiple component carriers. In this case, and by way of a non-limiting example, the PCC downlink and uplink carriers may be on a licensed band while one or more SCCs may be on license exempt bands, where available. It may be preferable to have all control information be carried on the PCC to ensure robustness, with the SCC being used for data whenever it is available. In one example, extension carriers can be used as SCCs in the license exempt bands.

To effectively deploy LTE in license exempt frequencies, a collision avoidance mechanism such as carrier sensing or RTS/CTS must be used. Even with the use of such mechanisms, hidden nodes (e.g., nodes that cannot hear the eNB) can present a problem. For instance, if RTS/CTS protocol were used, there may be hidden nodes that could not hear the RTS signal from the eNB. Thus, when the eNB schedules a UE that is near the hidden nodes for uplink transmission, the UE may not be able to transmit if it detects ongoing transmissions from the hidden nodes or if the assigned channel is already reserved.

Figure 3:
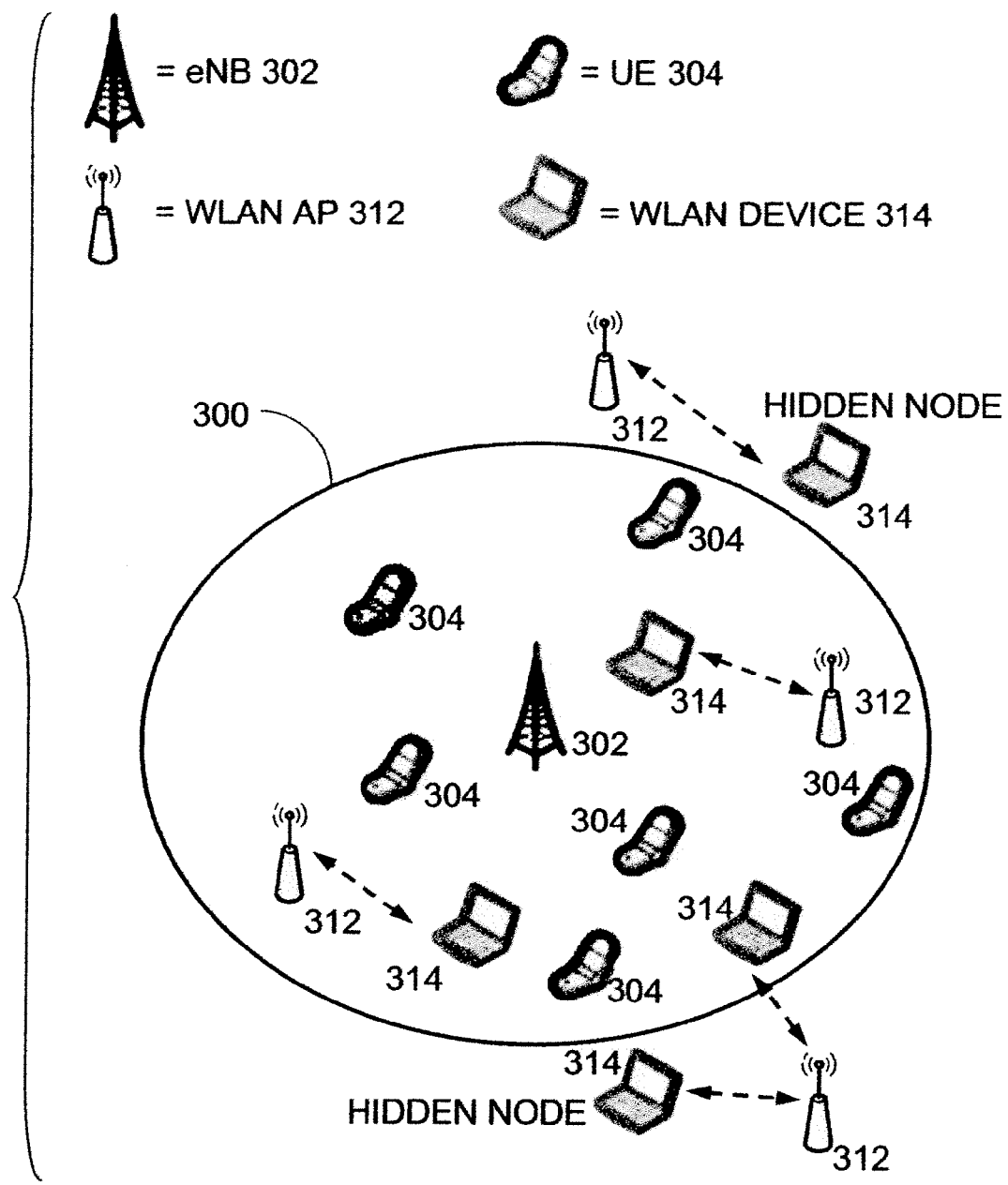
FIG. 3 shows an example of how the operation of WLAN devices can interfere with a LTE system and its usage of license exempt bands.

FIG. 3 shows an example of how the operation of WLAN devices can interfere with a LTE system and its usage of license exempt bands. As shown in FIG. 3, a LTE cell 300 is overseen by a LTE eNB 302. A number of UEs 304 (e.g., LTE-compliant mobile devices, such as cellular phones) is serviced by the eNB 302. In addition, both nearby and within the cell there is a number of WLAN APs 312 operating on license exempt bands. The WLAN APs 312 service one or more WLAN devices 314. Since they operate on license exempt bands (in accordance with the WLAN protocol), the WLAN devices 314 have the potential to interfere with usage of the license exempt spectrum by the eNB 302. In particular, so-called "hidden nodes" (e.g., nodes that cannot hear the eNB 302, for example, because they are located outside the LTE cell 300) can present a problem. For example, should the eNB 302 desire to utilize a portion of the same license exempt spectrum on which one or more of the hidden nodes is currently transmitting/using, the corresponding UE(s) 304 may not be able to transmit on the license exempt spectrum due its usage by the hidden nodes.

Various exemplary techniques can be used to detect the existence of hidden nodes within range of a LTE system that is operating in one or more license exempt bands. If hidden nodes are found to significantly affect performance, further exemplary techniques may be used to mitigate this performance loss. As a non-limiting example, the eNB can schedule multiple grants simultaneously for a UE in order to increase the likelihood of a free channel (e.g., if scheduling on an license exempt band is performed and if the eNB determines or considers such scheduling to be desirable and/or necessary, for example, in view of current cell load and/or capacity).

Figure 1B:
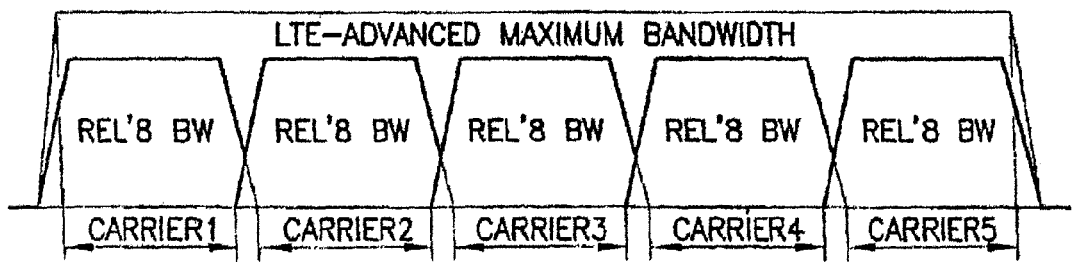
FIG. 1B shows an example of carrier aggregation as proposed for the LTE-A system.
Figure 2A:
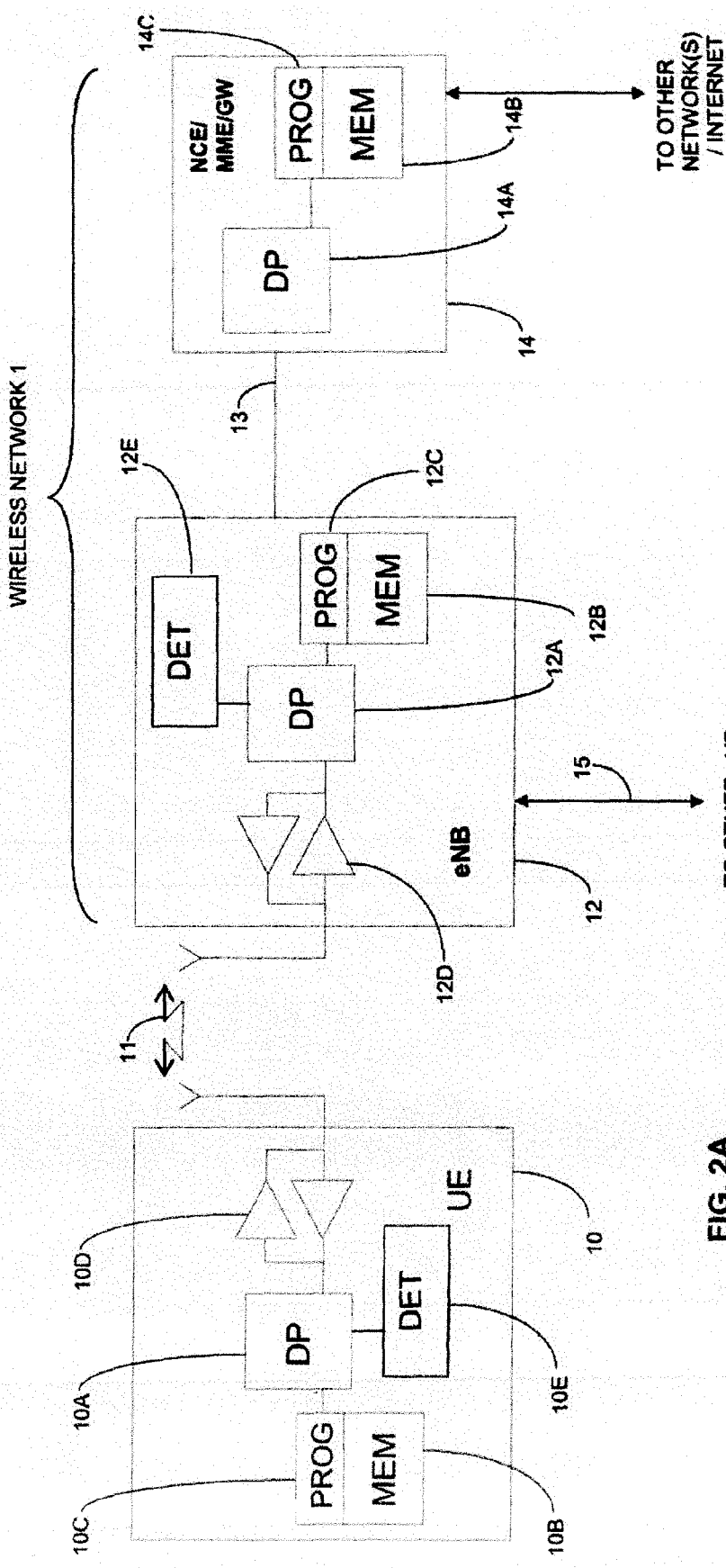
FIG. 2A shows a simplified block diagram of various exemplary electronic devices that are suitable for use in practicing the exemplary embodiments of this invention.

Before describing in further detail the exemplary embodiments of this invention, reference is made to FIG. 2A for illustrating a simplified block diagram of various exemplary electronic devices and apparatus that are suitable for use in practicing the exemplary embodiments of this invention. In FIG. 2A, a wireless network 1 is adapted for communication over a wireless link 11 with an apparatus, such as a mobile communication device which may be referred to as a user equipment (UE) 10, via a network access node, such as a Node B (base station), and more specifically an eNB 12. The network 1 may include a network control element (NCE) 14 that may include the MME/S GW functionality shown in FIG. 1, and which provides connectivity with one or more other networks, such as a telephone network and/or a data communications network (e.g., the Internet). The UE 10 includes a controller, such as a computer, processor or data processor (DP) 10A, a computer-readable memory medium embodied as a memory (MEM) 10I3 that stores a program of computer instructions (PROG) 10C, and a suitable radio frequency (RF) interface 10D for bidirectional wireless communications with the eNB 12 via one or more antennas.

The eNB 12 includes a controller, such as a computer, processor or data processor (DP) 12A, a computer-readable memory medium embodied as a memory (MEM) 12B that stores a program of computer instructions (PROG) 12C, and a suitable radio frequency (RF) interface 12D for communication with the UE 10 via one or more antennas. The eNB 12 is coupled via a data/control path 13 to the NCE 14. As a non-limiting example, the path 13 may be implemented as the S1 interface shown in FIG. 1.

The NCE 14 includes a controller, such as a computer, processor or data processor (DP) 14A and a computer-readable memory medium embodied as a memory (MEM) 14B that stores a program of computer instructions (PROG) 14C. As noted above, the NCE 14 is coupled via a data/control path 13 to the eNB 12. The eNB 12 may also be coupled to one or more other eNBs via data/control path 15, which may be implemented as the X2 interface shown in FIG. 1, for example.

The RF interface 10D, 12D of the UE 10 and/or eNB 12 may comprise one or more transmitters, one or more receivers and/or one or more transceivers, as non-limiting examples. In other exemplary embodiments, the RF interface 10D, 12D of the UE 10 and/or eNB 12 may comprise one or more wireless interfaces and/or one or more communication components configured to perform unidirectional and/or bidirectional wireless communication with one or more other apparatus and/or devices.

At least one of the PROGs 10C and 12C is assumed to include program instructions that, when executed by the associated DP 10A, 12A, enable the respective device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention, the UE 10 may be assumed to also include a detection block (DET) 10E, and the eNB 12 may include a detection block (DET) 12E. These DET 10E, 12E may comprise at least one processor, at least one storage component (e.g., memory), at least one program (e.g., executable by the DP 10A, 12A and/or other circuitry), at least one circuit, at least one integrated circuit, at least one function, at least one processing block and/or other components. The DET 10E, 12E assists the respective apparatus UE 10, eNB12 in the detection of hidden nodes and/or one or more interfering transmissions. In some exemplary embodiments, the DET 10E, 12E additionally or instead provides instructions for responding to the detection of hidden nodes and/or one or more interfering transmissions.

In general, the various embodiments of the UE 10 can include, but are not limited to, mobile nodes, mobile stations, mobile phones, cellular phones, personal digital assistants (PDAs) having wireless communication capabilities, mobile routers, relay stations, relay nodes, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

FIG. 2B illustrates further detail of an exemplary UE 10 in both plan view (left) and sectional view (right). Exemplary embodiments of the invention may be embodied in one or more combinations that include one or more function-specific components, such as those shown in FIG. 2B. As shown in FIG. 2B, the UE 10 includes a graphical display interface 20, a user interface 22 comprising a keypad, a microphone 24 and speaker(s) 34. In further exemplary embodiments, the UE 10 may also encompass touch-screen technology at the graphical display interface 20 and/or voice-recognition technology for audio signals received at the microphone 24. A power actuator 26 controls the UE 10 being turned on and/or off by the user. The UE 10 may include a camera 28, which is shown as forward facing (e.g., for video calls) but may alternatively or additionally be rearward facing (e.g., for capturing images and video for local storage). The camera 28 may be controlled by a shutter actuator 30 and optionally by a zoom actuator 32, which may alternatively function as a volume adjustment for the speaker(s) 34 when the camera 28 is not in an active mode.

Within the sectional view of FIG. 2B are seen multiple transmit/receive antennas 36 that are typically used for wireless communication (e.g., cellular communication). The antennas 36 may be multi-band for use with other radios in the UE. The operable ground plane for the antennas 36 is shown by shading as spanning the entire space enclosed by the UE housing, though in some embodiments the ground plane may be limited to a smaller area, such as disposed on a printed wiring board on which a power chip 38 is formed. The power chip 38 controls power amplification on the channels being transmitted on and/or across the antennas that transmit simultaneously, where spatial diversity is used, and amplifies received signals. The power chip 38 outputs the amplified received signal to the radio frequency (RF) chip 40, which demodulates and downconverts the signal for baseband processing. The baseband (BB) chip 42 detects the signal, which is then converted to a bit-stream and finally decoded. Similar processing occurs in reverse for signals generated in the UE 10 and transmitted from it.

Signals to and from the camera 28 pass through an image/video processor (video) 44, which encodes and decodes the image data (e.g., image frames). A separate audio processor 46 may also be present to control signals to and from the speakers (spkr) 34 and the microphone 24. The graphical display interface 20 is refreshed from a frame memory (frame mem) 48 as controlled by a user interface/display chip 50, which may process signals to and from the display interface 20 and/or additionally process user inputs from the keypad 22 and elsewhere.

Certain exemplary embodiments of the UE 10 may also include one or more secondary radios such as a wireless local area network radio (WLAN) 37 and/or a Bluetooth® radio (BT) 39, which may incorporate one or more on-chip antennas or be coupled to one or more off-chip antennas. Throughout the UE 10 are various memories, such as a random access memory (RAM) 43, a read only memory (ROM) 45, and, in some exemplary embodiments, a removable memory such as the illustrated memory card 47. In some exemplary embodiments, the various programs 10C are stored on the memory card 47. The components within the UE 10 may be powered by a portable power supply such as a battery 49.

The aforesaid processors 38, 40, 42, 44, 46, 50, if embodied as separate entities in the UE 10 or the eNB 12, may operate in a master-slave relationship with respect to the main/master processor 10A, 12A. Exemplary embodiments of this invention need not be disposed in a central location, but may instead be disposed across various chips and memories as shown or disposed within another processor that combines some of the functions described above for FIG. 2B. Any or all of these various processors of FIG. 2B may access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which, in some exemplary embodiments, may include an array of tower-mounted antennas rather than the antennas 36 shown in FIG. 2B.

Note that the various processors and/or chips (e.g., 38, 40, 42, etc.) described above may be combined into a fewer number of such processors and/or chips and, in a most compact case, may be embodied physically within a single processor or chip.

While described above in reference to memories, these components may generally be seen to correspond to one or more storage devices, storage circuits, storage components and/or storage blocks. In some exemplary embodiments, these components may comprise one or more computer-readable mediums, one or more computer-readable memories and/or one or more program storage devices.

While described above in reference to processors, these components may generally be seen to correspond to one or more processors, data processors, processing devices, processing components, processing blocks, circuits, circuit devices, circuit components, circuit blocks, integrated circuits and/or chips (e.g., chips comprising one or more circuits or integrated circuits).

To deploy a LTE system capable of operating in license exempt bands, it is desirable to utilize a collision avoidance MAC mechanism. Two non-limiting examples of possible techniques include: (1) listen before talk, and (2) RTS/CTS. Both mechanisms are used in current WiFi systems. In the listen before talk scheme, a device listens to the channel for a period of time and, if no ongoing transmission is observed, the device can start its transmission. In the RTS/CTS scheme, the device listens to the channel for a period of time and, if no ongoing transmission is observed, the device sends a RTS message to the destination. The destination responds with a CTS message and data transmission can occur. The RTS and CTS messages reserve the channel for the duration of the data transmission and any subsequent acknowledgment transmission.

Figure 4:
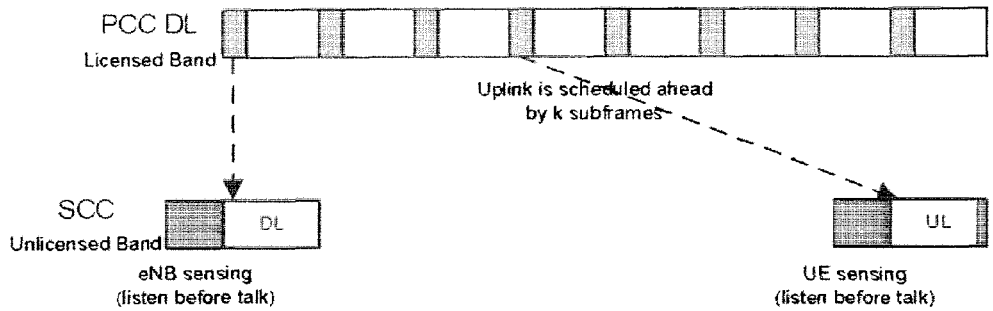
FIG. 4 shows an example of a listen before talk mechanism.

FIG. 4 shows an example of a listen before talk mechanism. Since the uplink is scheduled ahead by some number k of subframes, the eNB cannot be sure that the UE will be able to transmit the uplink packet (e.g., due to hidden nodes, the channel being reserved or ongoing transmission that begins after the eNB transmits the scheduling assignment). As shown in FIG. 4, a listen before talk mechanism uses a sensing period prior to transmission in order to determine if the resources are available for use.

Figure 5:
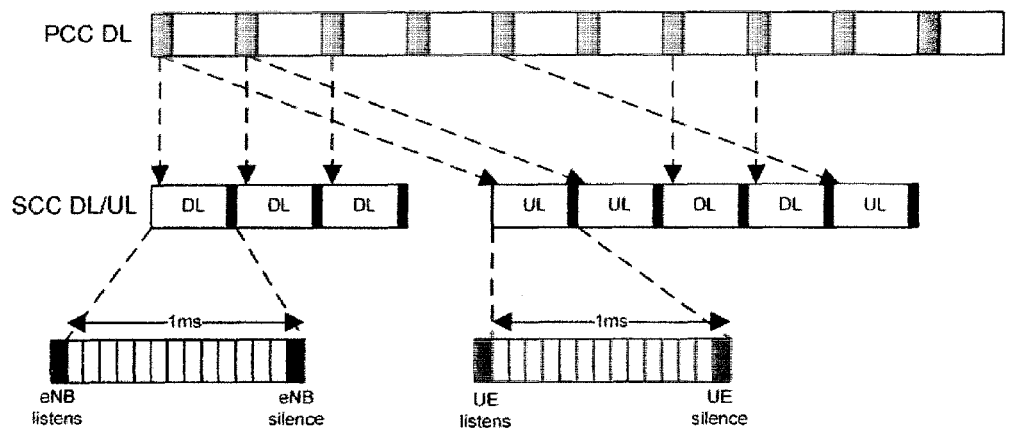
FIG. 5 depicts an exemplary listen before talk mechanism that includes silence for the last symbol of subframes.

Another example for supporting channel sensing is to implement listen before talk by leaving the last symbol of the subframe as silence (DTX). FIG. 5 depicts an example of this. In the DL, the eNB uses the DTX in the last symbol to perform channel sensing before starting transmission of the next subframe. In the uplink shown in FIG. 5, the UE is scheduled four frames beforehand. The UE will have to sense the channel prior to actual transmission. If the UE senses an ongoing transmission, the UE will then refrain from sending uplink data. Note that LTE already allows the last symbol of the subframe to be punctured for SRS. As a result, legacy LTE UEs can also easily be supported in this context. Legacy LTE UEs, however, will not be aware of the sensing requirement and thus may generate interference with nearby systems.

Figure 6:
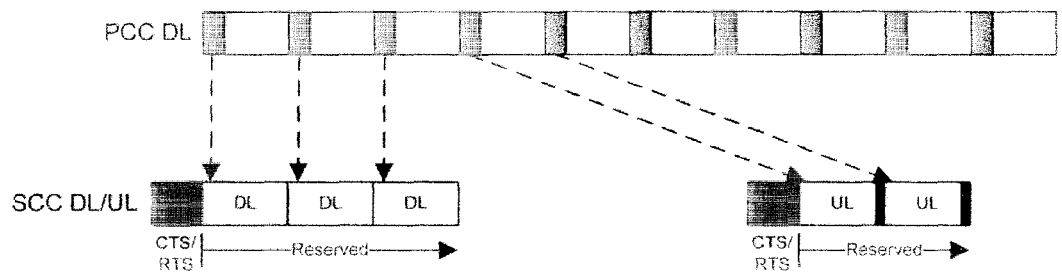
FIG. 6 illustrates an exemplary RTS/CTS mechanism.

In the alternative, LTE deployment can use a RTS/CTS mechanism. This is shown in FIG. 6. In this case, the eNB will send both RTS and CTS signals. Note that in the RTS/CTS protocol where the eNB will transmit both RTS and CTS, it is not necessary for the eNB to transmit the RTS, only the CTS. This reduces unnecessary transmissions and overhead. The RTS/CTS mechanism also allows other systems more opportunities to transmit data. It is noted that by having the eNB send both RTS and CTS signals this will eliminate the need for the UE to be capable of non-LTE transmissions (e.g., the CTS signal that the UE would otherwise have to transmit). When the RTS/CTS protocol is used, no additional sensing is needed on the DL since the channel can be reserved ahead of time. In case of a timing difference between the FCC and SCC, the reserved time can account for this timing difference.

For the uplink, however, even when the channel is reserved by the eNB, it is possible that uplink transmissions will interfere with nearby systems due to nodes that cannot hear the RTS/CTS transmission from the eNB (i.e., so-called "hidden nodes," as noted above). In this case, the UE must sense the channel first before transmission.

As previously noted, even with use of a collision avoidance mechanism such as carrier sensing or a modified RTS/CTS, hidden nodes (e.g., nodes that cannot hear the eNB) can present a problem. This was discussed above with respect to FIG. 3. For example, if a modified RTS/CTS protocol is used, the hidden nodes cannot hear the RTS/CTS signals from the eNB. Thus, when the eNB schedules a UE that is near the hidden nodes for uplink transmission, the UE may not be able to transmit if the UE detects ongoing transmission from the hidden nodes (or if the channel is already reserved by the hidden nodes).

Several exemplary techniques are available to detect the existence of hidden nodes within range of a LTE system operating in one or more license exempt bands:

DTX detection (or similar scheme) to detect that the UE did not transmit on the uplink when an uplink scheduling grant is given. By analyzing some simple statistics (e.g., CQI, SINR, BLER, path loss, detection of interfering signals, interference, etc.), it can be determined whether the UE is near hidden nodes and is suffering from heavy interference. In such a case, the UE may not be able to transmit when an uplink grant is provided.

UE feedback of license exempt band information (e.g., RSRP, RSRQ, CQI, and/or IoT) to help determine signal quality and interference level from hidden nodes.

Long sensing time at the eNB can be used to detect weak transmissions from the surrounding area (e.g., from the hidden nodes).

If hidden nodes are found to significantly affect performance, then one or more of the following exemplary techniques may be used to mitigate this performance loss:

The eNB can schedule multiple grants simultaneously for a UE in order to increase the likelihood of a free channel. In some exemplary embodiments, this is performed (only) if scheduling for a license exempt band and/or if the eNB considers it desirable and/or necessary.

The multiple grants could be on different frequencies and/or at different times. If the transmission at the first time is not successful, there could be a schedule (e.g., pre-established) for the next attempt (e.g., the next frequency and/or time that should be tried).

A default technique or position could be to give grants that were successful immediately prior (e.g., for immediately prior transmissions). If some grants have been failing many times, these grants could be avoided.

The eNB and other supporting infrastructure could also listen to the traffic on the license exempt bands and learn to predict potential holes in usage of each channel. Scheduling could be based on these predictions.

Figure 7A:
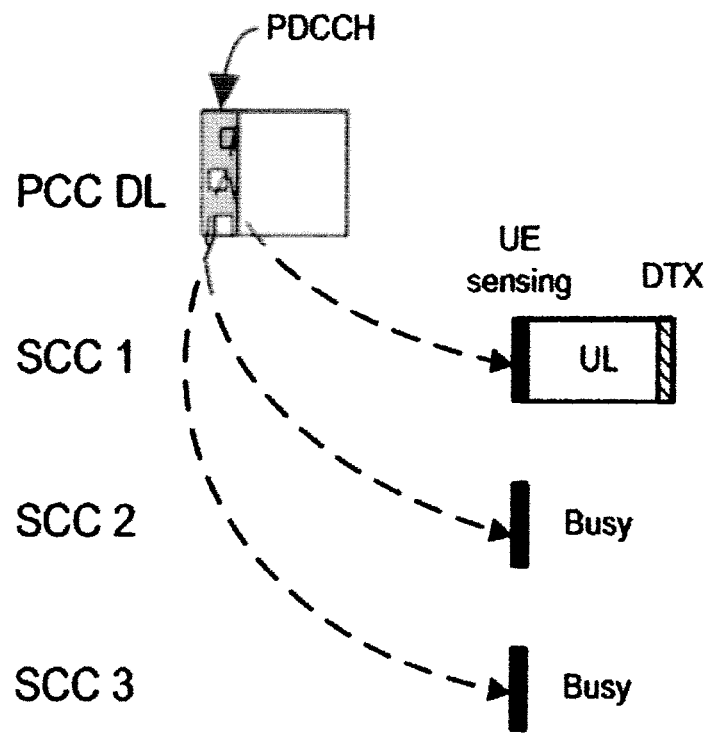
FIG. 7A shows an example of an eNB assigning a UE multiple uplink grants on different frequencies.

FIG. 7A shows an example of an eNB assigning a UE multiple uplink grants on different frequencies. In this example, the UE has sensed (e.g., determined via listen before talk and/or RTS/CTS) that SCC1 is available while SCC2 and SCC3 are not (e.g., "busy"). Thus, the UE uses SCC1 for uplink transmission.

Figure 7B:
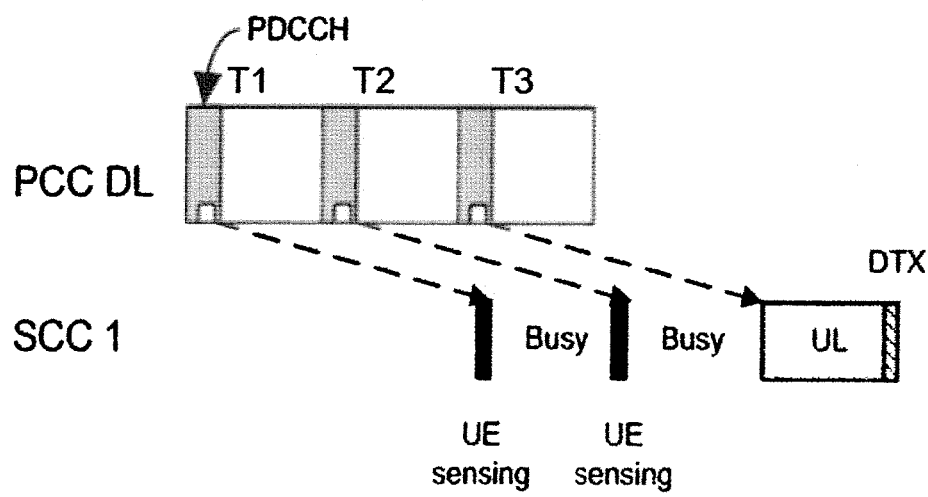
FIG. 7B shows an example of an eNB assigning a UE multiple uplink grants at different times.

FIG. 7B shows an example of an eNB assigning a UE multiple uplink grants at different times. In this example, the UE has sensed (e.g., determined via listen before talk and/or RTS/CTS) that timeslots T1 and T2 are unavailable (e.g., being used by another node, such as a hidden node; "busy") whereas timeslot T3 is available. Thus, the UE uses timeslot T3 for its uplink transmission.

Figure 7C:
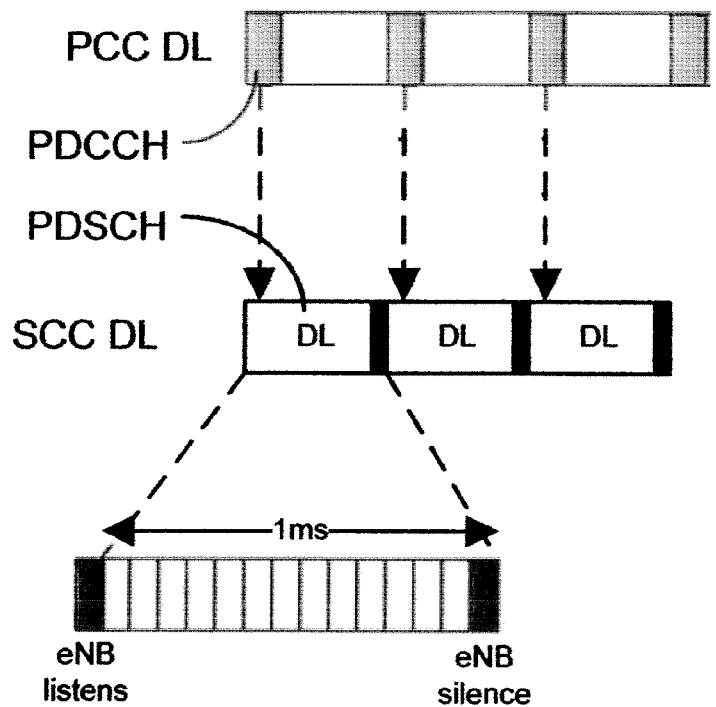
FIG. 7C shows an example of an eNB using multiple downlink grants for communication with one or more UEs.

FIG. 7C shows an example of an eNB using multiple downlink grants at different times for communication with one or more UEs. As a non-limiting example, and as shown in FIG. 7C, the PDCCH may remain on the PCC while the SCC, if/when the SCC is available, is used for the PDSCH. While shown in FIG. 7C with respect to multiple downlink grants at different times, in other exemplary embodiments the eNB may use one or more SCCs for multiple downlink grants on different frequencies (e.g., similar to the uplink example shown in FIG. 7A). In further exemplary embodiments, the eNB may use both time and frequency-based multiple grants on a plurality of SCCs.

Figure 7D:
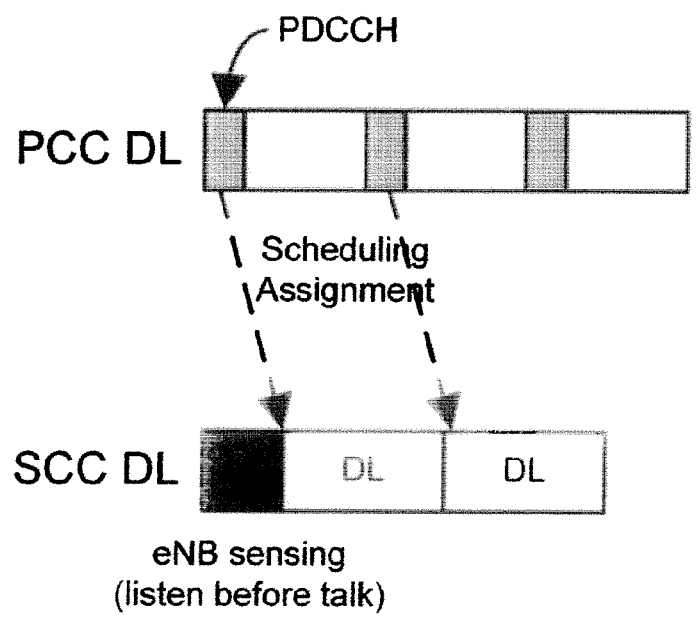
FIG. 7D shows an example an eNB using scheduling alignment with a SCC for downlink communication with one or more UEs.

In some exemplary embodiments, the PCC and SCCs may be time-aligned, for example, for downlink grants. FIG. 7D shows an example an eNB using scheduling alignment with a SCC for downlink communication with one or more UEs. In such a case where the downlink PCC and SCCs are time-aligned, the eNB can sense the channel on the SCC to ensure that there is no on-going transmission in the SCC.

However, the PCC and SCCs may not be time-aligned. In this case, the downlink grant is given in the PCC but the eNB will have to listen to the SCC before deciding whether the eNB can transmit the DL data to the UE. In case the eNB senses another transmission, the eNB will have to abort DL transmission on the SCC. If the transmission is aborted, the eNB can schedule another transmission as soon as possible without having to wait for the feedback from the UE. Alternatively, the eNB can give multiple downlink scheduling grants (e.g., on multiple frequencies/SCCs) in order to increase the likelihood of a free channel.

While shown separately in FIGS. 7A-7D, it should be appreciated that these techniques may be combined in any suitable manner. For example, an eNB may assign a UE multiple grants across both different frequencies (e.g., multiple SCCs) and different times (e.g., multiple timeslots, frames and/or subframes). As another example, an eNB may utilize SCCs with multiple grants for both uplink and downlink communications.

In the above examples, the UE may include a period of silence (DTX) at the end of the time period for transmission (e.g., the last symbol of the uplink subframe) in order to enable channel sensing.

As non-limiting examples, the multiple grants may be given via: (1) independent DCI using multiple assignments or grants (e.g., for the examples shown in FIGS. 7A and 7B); or (2) a new DCI format using one assignment or grant. It may be the case that introducing a new DCI can lead to significant savings in PDCCH overhead. Such a new DCI format may use an expanded carrier indicator field or time indicator field, or a combination of both, as non-limiting examples. For example, a bitmap of 1010 may indicate grants in component carriers 0 and 2, or subframes k+4 and λ+6. The new DCI format may also include different MCS levels for the different grants. However, this may increase the size of the DCI (e.g., substantially) and, thus, may not be preferred.

Figure 8:
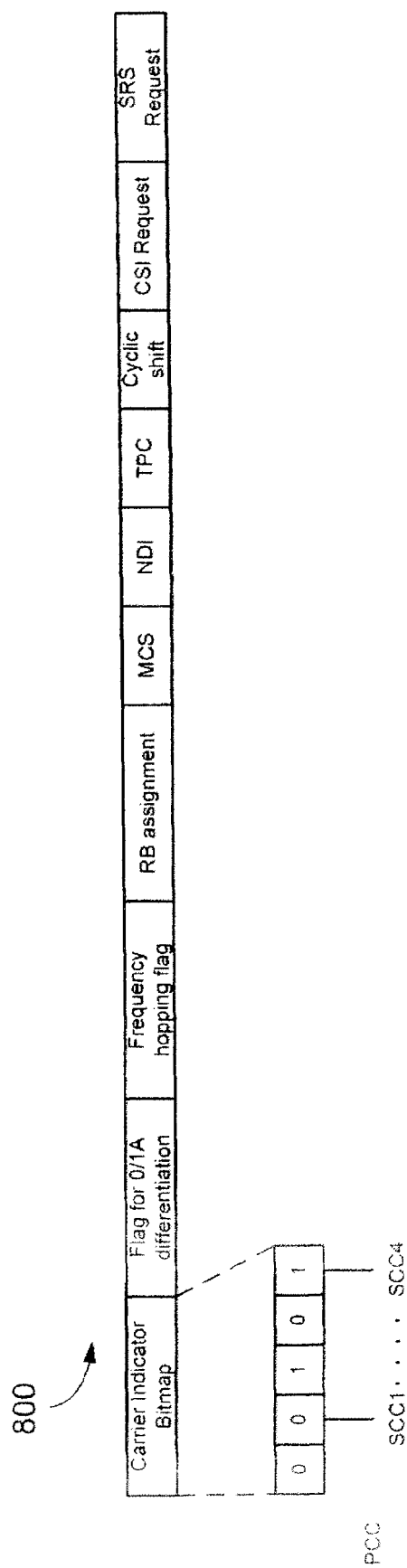
FIG. 8 shows an example of a new DCI format for uplink assignments, with a bitmap, suitable for implementing various exemplary embodiments of the invention.

FIG. 8 shows an example of a new DCI format 800 for uplink assignments, with a bitmap, suitable for implementing various exemplary embodiments of the invention. As an example, the uplink assignment on the PCC can carry information for grants on the SCCs, for example, using a carrier indicator bitmap. As a further example, this bitmap may use one bit per SCC to refer to (e.g., signal, indicate, assign) individual SCCs by index (e.g., index values from 0 to n−1 for n SCCs). As another example, instead of or in addition to indicating different SCCs, the indicator bitmap may indicate different timeslots, frames and/or subframes assigned to that UE. As a further example, the mapping of this bitmap may be known by the UE a priori (e.g., in accordance with a standard, document or other regulation-establishing entity).

In some exemplary embodiments, the eNB may inform the UE whether or not a given grant is unique. As noted above, in some exemplary embodiments different MCS levels are used for different allocations. In some exemplary embodiments, a field is provided to allow (e.g., instruct) a UE to use one or more of the specified allocations. For example, the UE may transmit one data packet in one allocation, one data packet (e.g., a same data packet or same transmission) in multiple allocations, and/or multiple (e.g., different) data packets in multiple allocations. In some exemplary embodiments, the various options may be known by the UE a priori and the eNB merely instructs the UE which of the different options to use. As a further example, in some exemplary embodiments the UE selects a suitable option and applies the corresponding technique (e.g., based on one or more criteria known to the UE, such as CQI, SINR, BLER, path loss, detection of interfering signals, interference, etc.). As a non-limiting example, the different data packets transmitted on the multiple allocations may have different sizes.

In some exemplary embodiments, the UE may use a procedure to select which allocation to use when multiple grants are given. As non-limiting examples, the UE's procedure may account for one or more of MCS, CQI, SINR, BLER, path loss, detection of interfering signals and/or interference. In some exemplary embodiments, the UE selects an allocation based on instructions or preferences received from the eNB (e.g., operator preference). In some exemplary embodiments, the UE selects an allocation based on a preconfigured channel priority. In further exemplary embodiments, the UE selects an allocation at random.

Figure 9:
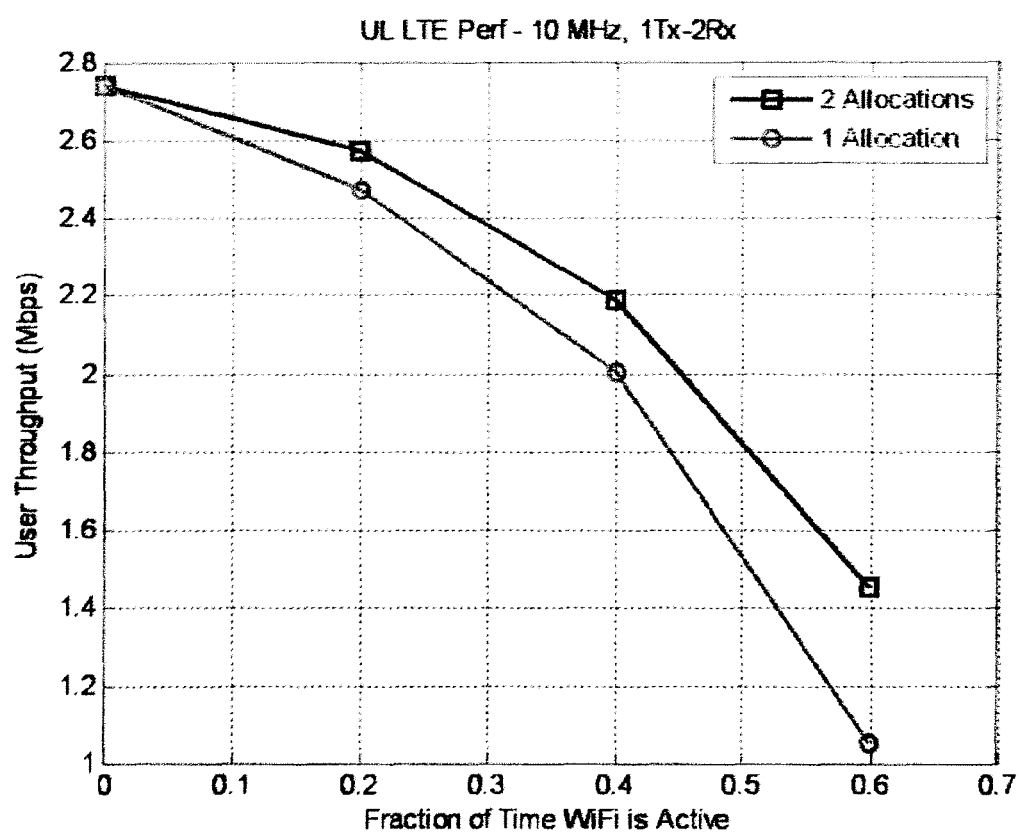
FIG. 9 is a graph of exemplary data for user throughput (Mbps) vs. fraction of time that a WiFi is active for a single allocation and for two allocations.

FIG. 9 is a graph of exemplary data for user throughput (Mbps) vs. fraction of time that a WiFi is active for a single allocation and for two allocations. User throughput decreases the greater fraction that the WiFi is active. As can be observed, in accordance with the exemplary embodiments of the invention, using two allocations instead of one increases the user throughput. This data is for a LTE system at 10 MHz with one transmission and two receptions.

Figure 10:
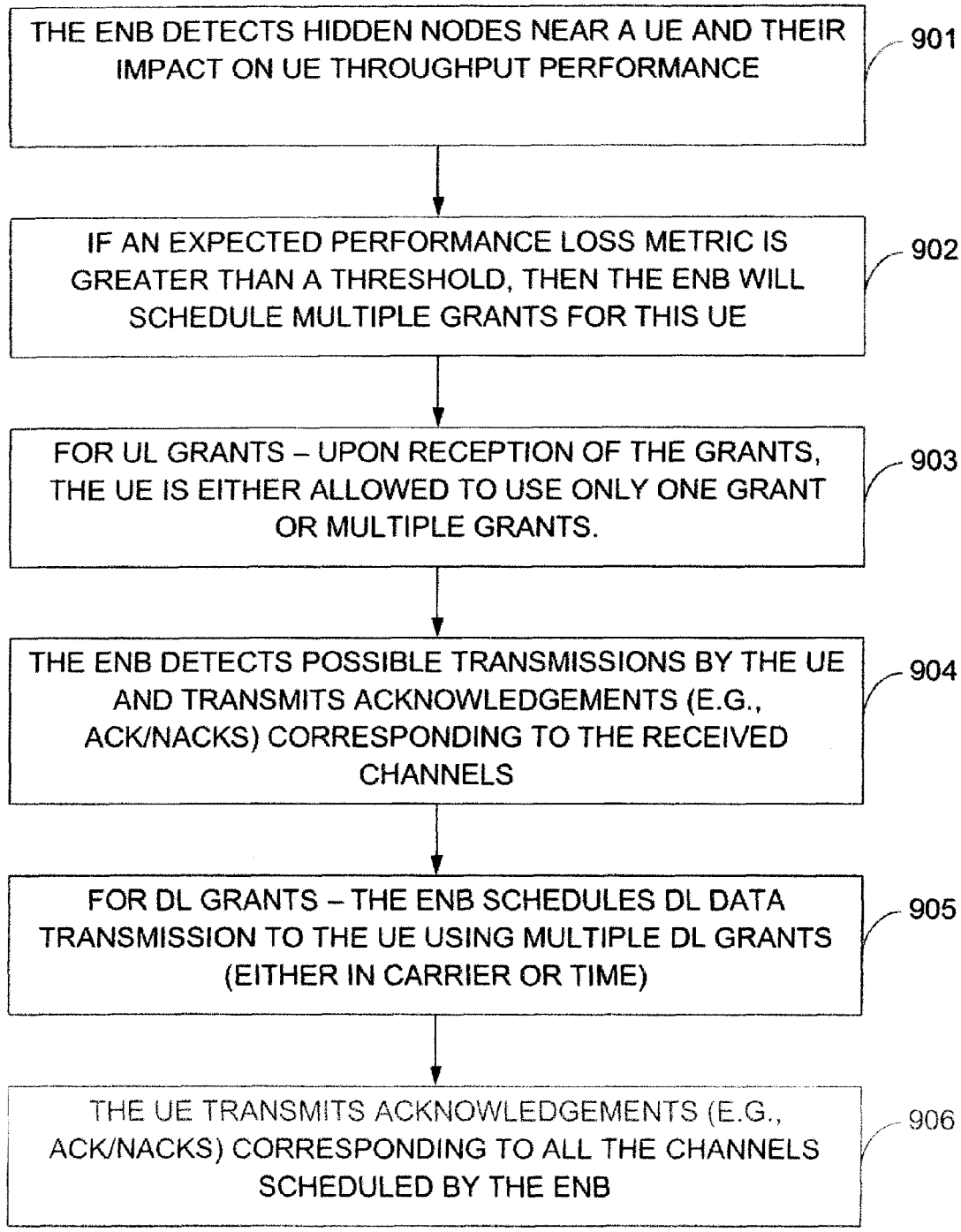
FIG. 10 depicts a flowchart illustrating one non-limiting example of a method, and execution of one or more computer programs, for practicing the exemplary embodiments of the invention.

Below is a non-limiting example of steps that may be performed for performing various (some) exemplary embodiments of the invention. This method (and/or execution of one or more computer programs) is illustrated in FIG. 10.

1. The eNB detects hidden nodes near a UE and their impact on UE throughput performance (e.g., reduced utilization or potential performance loss)'(901).

2. If an expected performance loss metric is greater than a threshold, then the eNB will schedule multiple grants for this UE (902).

3. For uplink grants—upon reception of the grants, the UE is either allowed to use only one grant or multiple grants. This may be configurable through either a UE-specific or system-wide parameter via higher-layer signaling (903).

If a UE is allowed to use only one grant, in case of multiple grants on different carriers, the UE senses the carriers and selects one for transmission. Carrier selection can be performed based on channel quality (e.g., using assigned MCS, SINR and/or path loss), operator preference (e.g., based on a preconfigured channel priority), or randomly. For consecutive grants in time, the UE may select the first available subframe or a randomly selected subframe.

If a UE is allowed to use multiple grants, in case of multiple grants on different carriers, the UE senses the carriers and selects all of the available channels for transmission subject to data availability. Channel preference can be similarly determined as in the previous paragraph. For consecutive grants in time, the UE may select all available subframes subject to data availability. Note that the transmission from each carrier/subframe is considered unique (each is a different data packet) and, therefore, each is treated independently.

4. The eNB detects possible transmissions by the UE and transmits acknowledgements (e.g., ACK/NACKs) corresponding to the received channels (904).

5. For DL grants—the eNB schedules DL data transmission to the UE using multiple DL grants (either in carrier or time) (905). The same information data packet is transmitted to the UE. However, the MCS levels may be different for different DL grants.

6. The UE transmits acknowledgements (e.g., ACK/NACKs) corresponding to all the channels scheduled by the eNB (906). If the packet was received successfully on one of the channels, the eNB may ignore other/subsequent acknowledgements from the UE.

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein.

Figure 11:
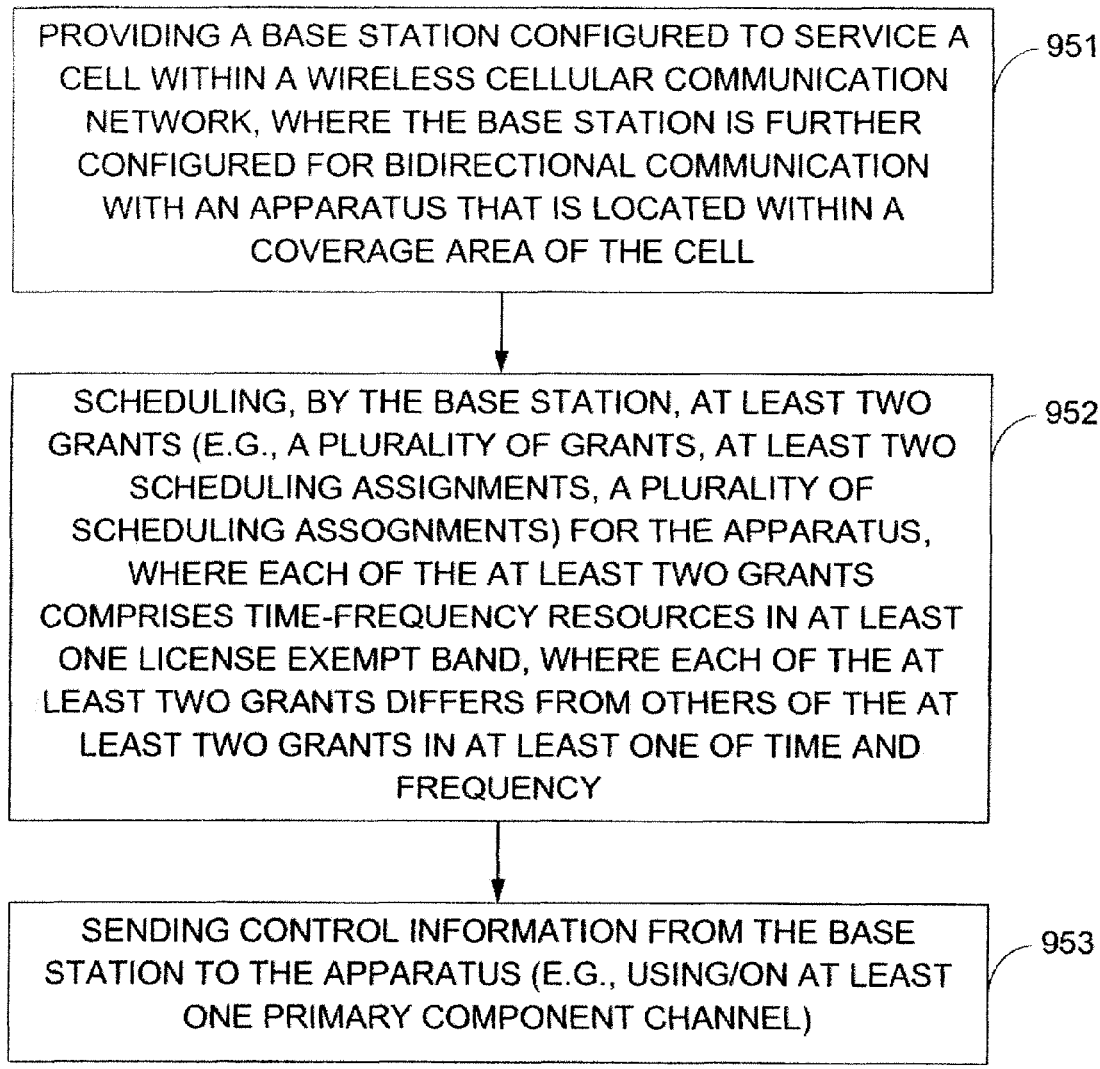
FIG. 11 depicts a flowchart illustrating another non-limiting example of a method, and execution of one or more computer programs, for practicing the exemplary embodiments of the invention.

(1) In one exemplary embodiment of the invention, and with reference to FIG. 11, a method comprising: providing a base station configured to service a cell within a wireless cellular communication network, where the base station is further configured for bidirectional communication with an apparatus that is located within a coverage area of the cell (951); and scheduling, by the base station, at least two grants (e.g., a plurality of grants, at least two scheduling assignments, a plurality of scheduling assignments) for the apparatus, where each of the at least two grants comprises time-frequency resources in at least one license exempt band, where each of the at least two grants differs from others of the at least two grants in at least one of time and frequency (952).

A method as above, where the at least two grants comprise at least two downlink grants. A method as in any above, where the at least two grants comprise at least two uplink grants. A method as in any above, where the at least two grants comprise at least one uplink grant and at least one downlink grant. A method as in any above, where the at least two grants comprise at least two uplink grants and at least one downlink grant. A method as in any above, where the at least two grants comprise at least two uplink grants and at least two downlink grants.

A method as in any above, where the at least two grants comprise a first uplink grant and a second uplink grant. A method as in any above, where the second uplink grant is scheduled in response to the base station determining that a second access point (e.g., a second base station) may be (e.g., is) utilizing the time-frequency resources of the first uplink grant for communication with a second apparatus. A method as in any above, further comprising: communicating, by the base station, with at least one apparatus in the cell on a channel (e.g., a control channel) comprising at least one of a broadcast channel (e.g., PBCH) and a downlink channel (e.g., PDCCH), where the second apparatus is unable to receive communications from the base station on the channel (e.g., due to the second apparatus being outside the coverage area of the cell).

A method as in any above, where the at least two grants comprise a first grant and a second grant. A method as in any above, where the first grant is on a first license exempt band and the second grant is on a second license exempt band (that is different from the first license exempt band). A method as in any above, where the first grant and the second grant are on a same license exempt band and differ in time. A method as in any above, where the first grant and the second grant differ in time resources. A method as in any above, where the first grant and the second grant differ only in time resources. A method as in any above, where the first grant and the second grant differ in frequency resources. A method as in any above, where the first grant and the second grant differ only in frequency resources. A method as in any above, where the first grant and the second grant differ in both time resources and frequency resources.

A method as in any above, where the at least one license exempt band comprises one or more unlicensed bands. A method as in any above, where the at least one license exempt band comprises one or more lightly-licensed bands. A method as in any above, where the at least one license exempt band comprises one or more licensed bands where the usage is secondary (e.g., not primary). A method as in any above, where the at least one license exempt band comprises at least one of: one or more unlicensed bands, one or more lightly-licensed bands, and one or more licensed bands where the usage is secondary (e.g., not primary).

A method as in any above, where the at least two grants are for at least one secondary component channel. A method as in any above, further comprising: communicating, by the base station, with the apparatus on at least one downlink channel (e.g., PDCCH) using at least one primary component channel. A method as in any above, further comprising: sending downlink control information from the base station to the apparatus (e.g., using/on at least one primary component channel), where the downlink control information comprises information (e.g., at least one bitmap) indicative of the at least two grants. A method as in any above, where the downlink control information comprises a bitmap that is indicative of the at least two grants. A method as in any above, where the definition (e.g., significance, specification, meaning) of the bitmap is commonly known to both the base station and the apparatus.

A method as in any above, further comprising: sending control information from the base station to the apparatus (e.g., using/on at least one primary component channel) (953). A method as in any above, where the control information comprises information (e.g., at least one bitmap) indicative of the at least two grants. A method as in any above, where the control information comprises a bitmap that is indicative of the at least two grants. A method as in any above, where the definition of the bitmap (e.g., significance, specification, meaning) is commonly known to both the base station and the apparatus. A method as in any above, where the control information is indicative of the at least two grants. A method as in any above, where the control information comprises at least one downlink control information packet (e.g., that is indicative of the at least two grants). A method as in any above, where the control information comprises a plurality of downlink control information packets (e.g., that are indicative of the at least two grants). A method as in any above, where the control information consists of one downlink control information packet (e.g., that is indicative of the at least two grants). A method as in any above, where the at least one downlink control information comprises at least one scheduling assignment corresponding to the at least two grants. A method as in any above, where the at least one downlink control information comprises at least two scheduling assignments corresponding (e.g., one each) to the at least two grants.

A method as in any above, where the wireless cellular communication network comprises a long term evolution of universal terrestrial radio access network (LTE, E-UTRAN). A method as in any above, where the apparatus comprises a mobile device, a mobile station, a mobile communication device, a mobile phone or a user equipment. A method as in any above, where the base station comprises an evolved Node B (e.g., an eNB).

A method as in any above, implemented as a computer program. A method as in any above, implemented as a computer program stored (e.g., tangibly embodied) on a computer-readable medium (e.g., a program storage device, a memory, a computer-readable memory, a computer-readable storage device, a non-transitory computer-readable medium). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor, a data processor, a computer, an apparatus) resulting in operations comprising the steps of the method (e.g., performance of those operations described by any of the methods disclosed herein).

(2) In another exemplary embodiment of the invention, and with further reference to FIG. 11, a program storage device readable by a machine (e.g., a computer-readable medium, a computer-readable memory, a computer-readable storage device, a non-transitory computer-readable medium), tangibly embodying (e.g., storing) a program of instructions (e.g., computer program instructions) executable by the machine (e.g., a processor, a data processor, a computer, an apparatus) for performing operations, said operations comprising: providing a base station configured to service a cell within a wireless cellular communication network, where the base station is further configured for bidirectional communication with an apparatus that is located within a coverage area of the cell (951); and scheduling, by the base station, at least two grants (e.g., a plurality of grants, at least two scheduling assignments, a plurality of scheduling assignments) for the apparatus, where each of the at least two grants comprises time-frequency resources in at least one license exempt band, where each of the at least two grants differs from others of the at least two grants in at least one of time and frequency (952).

A program storage device as in any above, wherein the program storage device comprises at least one computer-readable medium, at least one non-transitory computer-readable medium, at least one computer-readable storage medium, at least one computer-readable memory, at least one memory, at least one memory card, at least one removable memory, at least one storage device, at least one storage component and/or at least one storage circuit. A program storage device as in any above, further comprising one or more aspects of the exemplary embodiments of the invention as described herein (e.g., and particularly those described with respect to exemplary methods that may be implemented with a computer program).

(3) In a further exemplary embodiment of the invention, an apparatus comprising: at least one processor; and at least one memory including computer program code, the at least one memory and the computer program code being configured to, with the at least one processor, cause the apparatus at least to perform: service (e.g., manage, control, manage connections for) a cell within a wireless cellular communication network, where the apparatus is configured for bidirectional communication with another apparatus that is located within a coverage area of the cell; and schedule at least two grants (e.g., a plurality of grants, at least two scheduling assignments, a plurality of scheduling assignments) for the other apparatus, where each of the at least two grants comprises time-frequency resources in at least one license exempt band, where each of the at least two grants differs from others of the at least two grants in at least one of time and frequency.

An apparatus as above, where the apparatus comprises an access node, a base station and/or an eNB. An apparatus as in any above, further comprising one or more aspects of the exemplary embodiments of the invention as described herein.

(4) In another exemplary embodiment of the invention, an apparatus comprising: means for servicing a cell within a wireless cellular communication network, where the apparatus is configured for bidirectional communication with another apparatus that is located within a coverage area of the cell; and means for scheduling at least two grants (e.g., a plurality of grants, at least two scheduling assignments, a plurality of scheduling assignments) for the other apparatus, where each of the at least two grants comprises time-frequency resources in at least one license exempt band, where each of the at least two grants differs from others of the at least two grants in at least one of time and frequency.

An apparatus as above, where the means for servicing comprises at least one transmitter, at least one processor, at least one buffer, at least one memory, at least one receiver, at least one transceiver, and/or at least one antenna. An apparatus as in any above, where the means for scheduling comprises at least one processor, at least one transmitter, at least one memory, at least one circuit, at least one buffer, at least one transceiver and/or at least one programmable logic circuit. An apparatus as in any above, further comprising one or more aspects of the exemplary embodiments of the invention as described herein.

(5) In a further exemplary embodiment of the invention, an apparatus comprising: management circuitry configured to service a cell within a wireless cellular communication network, where the apparatus is configured for bidirectional communication with another apparatus that is located within a coverage area of the cell; and scheduling circuitry configured to schedule at least two grants (e.g., a plurality of grants, at least two scheduling assignments, a plurality of scheduling assignments) for the other apparatus, where each of the at least two grants comprises time-frequency resources in at least one license exempt band, where each of the at least two grants differs from others of the at least two grants in at least one of time and frequency.

An apparatus as in any above, further comprising one or more aspects of the exemplary embodiments of the invention as described herein.

Figure 12:
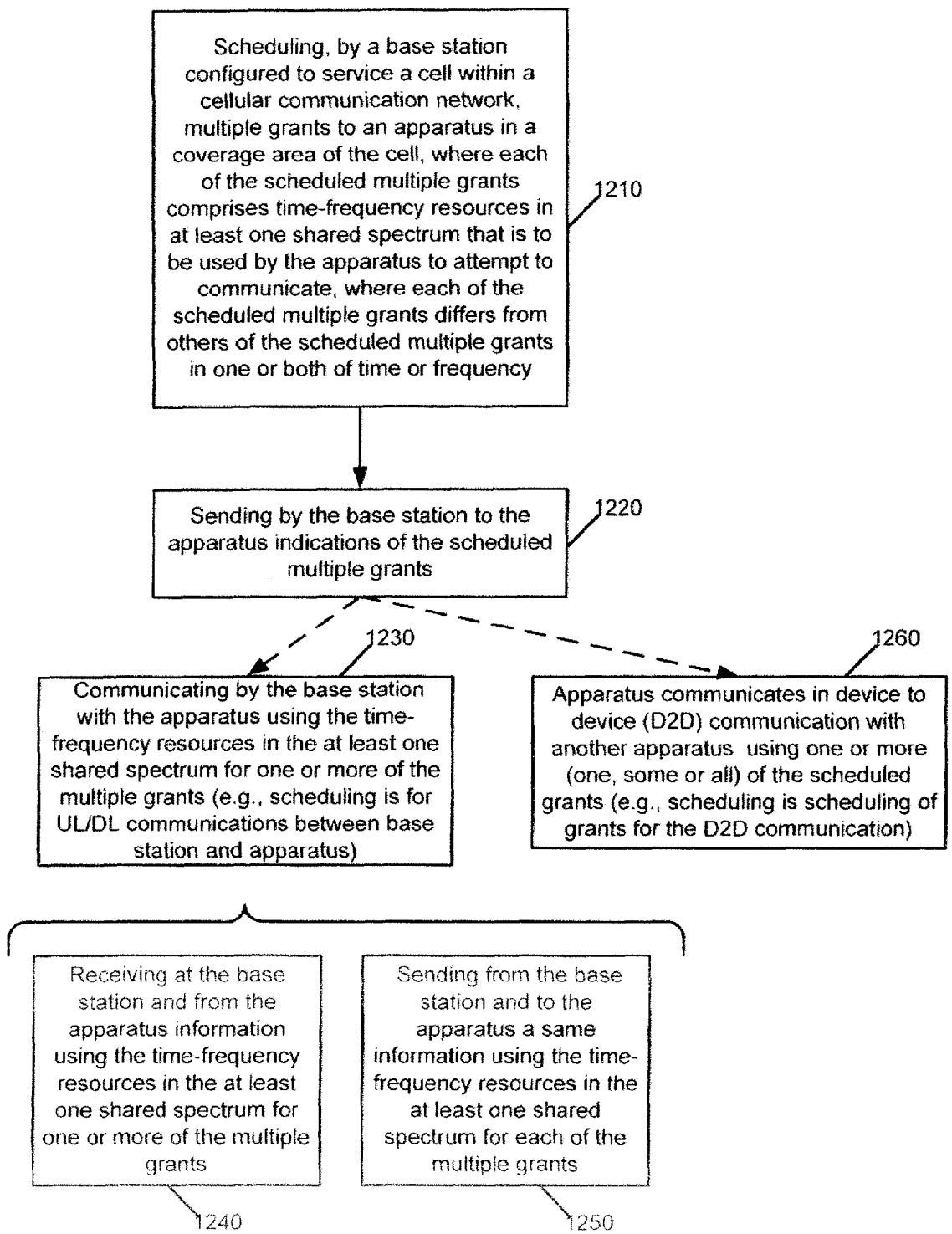
FIGS. 12 and 13 are logic flow diagrams for wireless communication scheduling on shared spectra, and illustrate the operation of an exemplary method, a result of execution of computer program instructions embodied on a computer readable memory, functions performed by logic implemented in hardware, and/or interconnected means for performing functions in accordance with exemplary embodiments.
Figure 13:
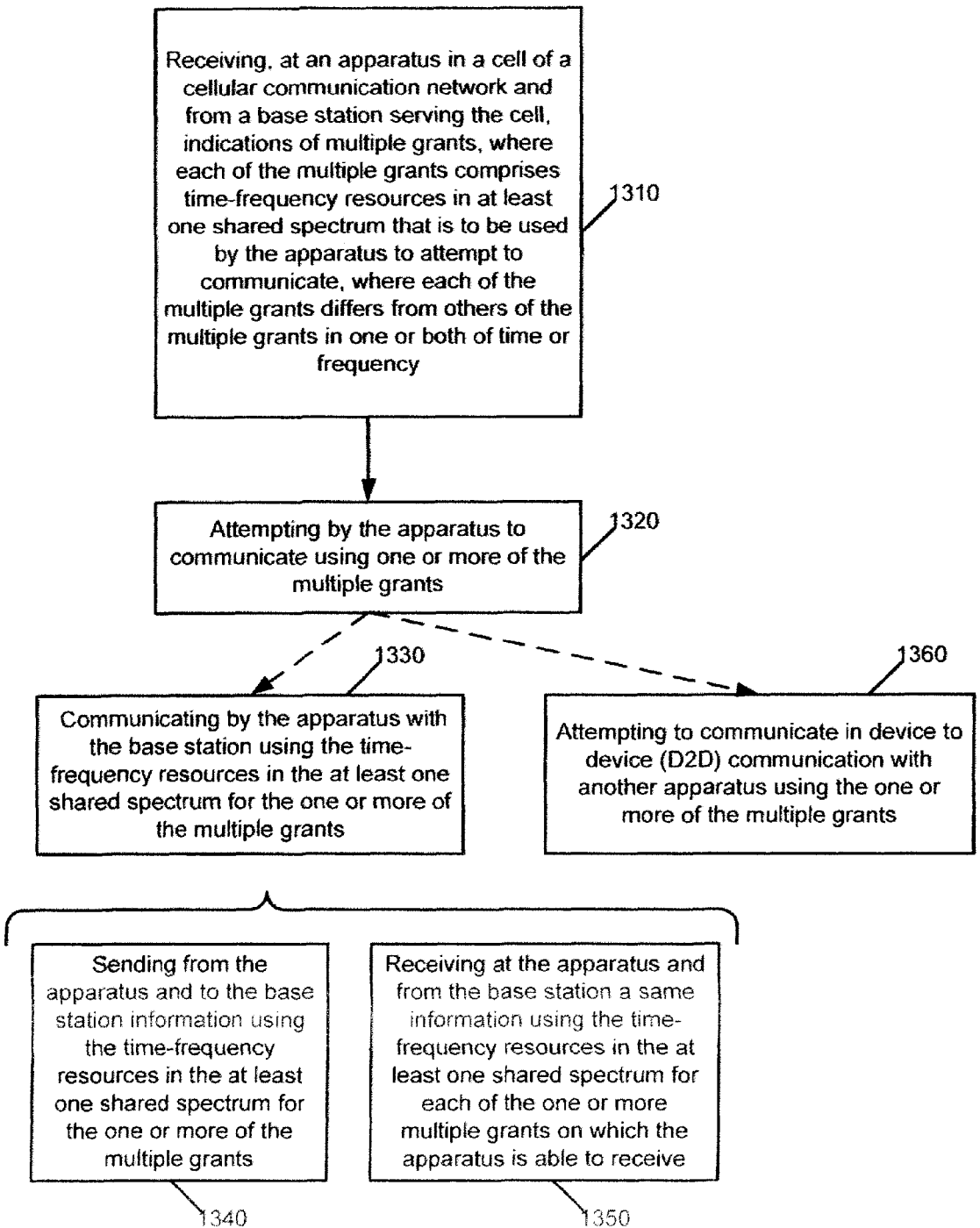

Referring to FIGS. 12 and 13, these are logic flow diagrams for wireless communication scheduling on shared spectra. These figures illustrate the operation of an exemplary method, a result of execution of computer program instructions embodied on a computer readable memory, operations performed by logic implemented in hardware, and/or interconnected means for performing operations in accordance with exemplary embodiments.

FIG. 12 is performed, e.g., by a base station such as an eNB. In block 1210, the base station performs the operation of scheduling, by a base station configured to service a cell within a cellular communication network, multiple grants to an apparatus in a coverage area of the cell. Each of the scheduled multiple grants comprises time-frequency resources in at least one shared spectrum that is to be used by the apparatus to attempt to communicate. Each of the scheduled multiple grants differs from others of the scheduled multiple grants in one or both of time or frequency. In block 1220, the base station performs the operation of sending by the base station to the apparatus indications of the scheduled multiple grants.

Blocks 1230 and 1260 illustrate certain possibilities for wireless communication scheduling on shared spectra. In particular, with respect to block 1230, the scheduling in block 1210 is for UL/DL communications between the base station and the apparatus. Thus, in block 1230, the base station performs the operation of communicating by the base station with the apparatus using the time-frequency resources in the at least one shared spectrum for one or more of the multiple grants. It is noted that an apparatus such as a UE, especially for UL, could use one, some, or all of the multiple grants. For example, if a UE receives two grants but only has enough data for one grant of the assignment, the UE can choose the best grant. In addition, some UEs might not be capable of transmitting on two or more UL carriers or may be power-limited, so these UEs just select, e.g., the best grant. Exemplary embodiments herein provide the UE multiple opportunities on different carriers or subframes to transmit because the UE could be blocked from transmitting due to the unlicensed nature of the channels. However, the UE can choose which of the grants the UE will act on (one, some, or all of the grants may be chosen).

In this example, in block 1240, the base station performs the operation of receiving at the base station and from the apparatus information using the time-frequency resources in the at least one shared spectrum for one or more of the multiple grants. As described above, a UE may attempt to transmit to the base station on one, some, or all of the multiple grants. In block 1250, the base station performs the operation of sending from the base station and to the apparatus a same information using the time-frequency resources in the at least one shared spectrum for each of the multiple grants. The UE may receive on one, some, or all of the multiple grants.

Block 1260 illustrates another possibility. In this example, the scheduling performed in block 1210 is scheduling of grants for a device to device (D2D) communication. The apparatus (e.g., a UE) communicates in device to device (D2D) communication with another apparatus using one or more (one, some or all) of the scheduled grants.

FIG. 13 is performed by an apparatus such as a UE. In block 1310, the apparatus performs the operation of receiving, at an apparatus in a cell of a cellular communication network and from a base station serving the cell, indications of multiple grants. Each of the multiple grants comprises time-frequency resources in at least one shared spectrum that is to be used by the apparatus to attempt to communicate. Each of the multiple grants differs from others of the multiple grants in one or both of time or frequency. In block 1320, the apparatus performs the operation of attempting by the apparatus to communicate using one or more of the multiple grants. As described above, the apparatus may use one, some, or all of the multiple grants.

Block 1330 is an example where the apparatus is to communicate with the base station using the multiple grants. In block 1330, the apparatus performs the operation of communicating by the apparatus with the base station using the time-frequency resources in the at least one shared spectrum for the one or more (one, some, or all) of the multiple grants. One possibility is illustrated by block 1340, where the apparatus performs the operation of sending from the apparatus and to the base station information using the time-frequency resources in the at least one shared spectrum for the one or more of the multiple grants. Another possibility is illustrated by block 1350, where the apparatus performs the operation of receiving at the apparatus and from the base station a same information using the time-frequency resources in the at least one shared spectrum for each of the one or more multiple grants. That is, reception is performed using each of the one or more multiple grants on which the apparatus is able to receive.

Block 1360 illustrates another possible example. In block 1360, the apparatus attempts to communicate in device to device (D2D) communication with another apparatus using the one or more of the multiple grants. The one or more of the multiple grants can include one, some, or all of the multiple grants.

In the above exemplary embodiments of the invention, servicing of a cell may be considered to correspond to at least one of overseeing, managing and/or enabling communication (e.g., wireless communication, bidirectional communication, etc.) within the cell. For example, an access node (e.g., base station, eNB) may be considered to service a cell by overseeing management of connections between the access node and other devices within the cell (e.g., UEs, mobile nodes, mobile devices, mobile stations). In some exemplary embodiments, certain aspects of the servicing may be controlled/overseen by the access node while other aspects are controlled/overseen by one or more other agents, devices or entities.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device (e.g., a computer-readable medium, a memory) readable by a machine (e.g., a computer, a mobile station, a mobile device, a mobile node), tangibly embodying a program of instructions (e.g., a program, a computer program) executable by the machine for performing operations. The operations comprise steps of utilizing the exemplary embodiments or steps of the method.

The various blocks shown in FIGS. 10 and 11 may be viewed as method steps, as operations that result from operation of computer program code and/or as one or more coupled components (e.g., function blocks, circuits, integrated circuits, logic circuit elements) constructed to carry out the associated function(s). The blocks depicted in FIGS. 10 and 11 may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 10 to 13 should be considered merely exemplary and non-limiting. It should be appreciated that the blocks depicted in FIGS. 10 to 13 may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 10 and 11 so as to implement one or more further exemplary embodiments of the invention, such as those described in further detail herein.

That is, the non-limiting, exemplary embodiments of the invention shown in FIGS. 10 to 13 may be implemented, practiced or utilized in conjunction with one or more further aspects in any combination (e.g., any combination that is practicable, suitable and/or feasible) and are not limited only to the blocks, steps, functions and/or operations illustrated in FIGS. 10 to 13.

The following are examples. Example 1. A method, comprising: scheduling, by a base station configured to service a cell within a cellular communication network, multiple grants to an apparatus in a coverage area of the cell, where each of the scheduled multiple grants comprises time-frequency resources in at least one shared spectrum that is to be used by the apparatus to attempt to communicate, where each of the scheduled multiple grants differs from others of the scheduled multiple grants in one or both of time or frequency; and sending by the base station to the apparatus indications of the scheduled multiple grants.

Example 2. A method as in example 1, where the multiple grants comprise one of the following: multiple downlink grants; multiple uplink grants; at least one uplink grant and at least one downlink grant; multiple uplink grants and at least one downlink grant; or multiple uplink grants and multiple downlink grants.

Example 3. A method as in example 1, where the multiple grants comprise a first uplink grant and a second uplink grant, and where the second uplink grant is scheduled in response to the base station determining that a second base station is utilizing the time-frequency resources of the first uplink grant for communication with a second apparatus.

Example 4. A method as in example 1, where the multiple grants comprise a first grant and a second grant, and where the first grant is on a first shared spectrum and the second grant is on a second shared spectrum that is different from the first shared spectrum.

Example 5. A method as in example 1, where the multiple grants comprise a first grant and a second grant, where the first grant and the second grant are on a same shared spectrum and differ in time.

Example 6. A method as in example 1, where the multiple grants comprise a first grant and a second grant, and where one of the following is true:

the first grant and the second grant differ in time resources;

the first grant and the second grant differ only in time resources;

the first grant and the second grant differ in frequency resources;

the first grant and the second grant differ only in frequency resources; and the first grant and the second grant differ in both time resources and frequency resources.

Example 7. A method as in any of the previous examples, where the multiple grants are for at least one secondary component channel.

Example 8. A method as in any of the previous examples, where sending further comprises sending by the base station and to the apparatus indications of the scheduled multiple grants on at least one downlink channel using at least one primary component channel.

Example 9. A method as in any of the previous examples, where sending further comprises sending control information from the base station to the apparatus, where the control information comprises information indicative of the multiple grants.

Example 10. A method as in example 9, where the control information comprises control information for one of uplink communication from the apparatus to the base station or downlink communication from the base station to the apparatus.

Example 11. A method as in example 9, where the downlink control information comprises a bitmap that is indicative of the multiple grants.

Example 12. A method as in example 11, where a definition of the bitmap is commonly known to both the base station and the apparatus.

Example 13. A method as in example 1, further comprising receiving by the base station and from the apparatus information using the time-frequency resources in the at least one shared spectrum for one or more of the multiple grants.

Example 14. A method as in example 1, further comprising sending from the base station and to the apparatus a same information using the time-frequency resources in the at least one shared spectrum for each of the multiple grants.

Example 15. A method as in any one of the previous examples, where the at least one shared spectrum comprises one or more unlicensed bands.

Example 16. A method as in any one of the previous examples, where the at least one shared spectrum comprises one or more lightly-licensed bands.

Example 17. A method as in any one of the previous examples, where the at least one shared spectrum comprises one or more licensed bands where usage in the one or more licensed bands is secondary.

Example 18. A method as in any one of examples 1 to 12 or 15 to 17, where scheduling further comprises scheduling multiple grants to be used by the apparatus to communicate in a device to device communication with another apparatus.

Example 19. An apparatus, comprising:

one or more processors; and one or more memories including computer program code, the one or more memories and the computer program code configured, with the one or more processors, to cause the apparatus to perform at least the following:

scheduling, by a base station configured to service a cell within a cellular communication network, multiple grants to an apparatus in a coverage area of the cell, where each of the scheduled multiple grants comprises time-frequency resources in at least one shared spectrum that is to be used by the apparatus to attempt to communicate, where each of the scheduled multiple grants differs from others of the scheduled multiple grants in one or both of time or frequency; and sending by the base station to the apparatus indications of the scheduled multiple grants.

Example 20. An apparatus, comprising:

means for scheduling, by a base station configured to service a cell within a cellular communication network, multiple grants to an apparatus in a coverage area of the cell, where each of the scheduled multiple grants comprises time-frequency resources in at least one shared spectrum that is to be used by the apparatus to attempt to communicate, where each of the scheduled multiple grants differs from others of the scheduled multiple grants in one or both of time or frequency; and means for sending by the base station to the apparatus indications of the scheduled multiple grants.

Example 21. An apparatus as in example 20, where the cellular communication network comprises a long term evolution of universal terrestrial radio access network.

Example 22. An apparatus as in any one of examples 19 or 21, where the apparatus comprises a user equipment.

Example 23. An apparatus as in any one of examples 19 to 22, where the base station comprises an evolved Node B.

Example 24. A method, comprising:

receiving, at an apparatus in a cell of a cellular communication network and from a base station serving the cell, indications of multiple grants, where each of the multiple grants comprises time-frequency resources in at least one shared spectrum that is to be used by the apparatus to attempt to communicate, where each of the multiple grants differs from others of the multiple grants in one or both of time or frequency; and attempting by the apparatus to communicate using one or more of the multiple grants.

Example 25. A method as in example 24, where attempting further comprises attempting to communicate using one, some, or all of the multiple grants.

Example 26. A method as in example 24, where the multiple grants comprise one of the following: multiple downlink grants; multiple uplink grants; at least one uplink grant and at least one downlink grant; multiple uplink grants and at least one downlink grant; or multiple uplink grants and multiple downlink grants.

Example 27. A method as in example 24, where the multiple grants comprise a first grant and a second grant, and where the first grant is on a first shared spectrum and the second grant is on a second shared spectrum that is different from the first shared spectrum.

Example 28. A method as in example 24, where the multiple grants comprise a first grant and a second grant, where the first grant and the second grant are on a same shared spectrum and differ in time.

Example 29. A method as in example 24, where the multiple grants comprise a first grant and a second grant, and where one of the following is true:

the first grant and the second grant differ in time resources;

the first grant and the second grant differ only in time resources;

the first grant and the second grant differ in frequency resources;

the first grant and the second grant differ only in frequency resources; and the first grant and the second grant differ in both time resources and frequency resources.

Example 30. A method as in any one of examples 24 to 29, where the multiple grants are for at least one secondary component channel.

Example 31. A method as in any one of examples 24 to 30, where receiving further comprises the indications of the multiple grants on at least one downlink channel using at least one primary component channel.

Example 32. A method as in any one of examples 24 to 31, where receiving further comprises receiving control information from the base station, where the control information comprises information indicative of the multiple grants.

Example 33. A method as in example 32, where the control information comprises control information for one of uplink communication from the apparatus to the base station or downlink communication from the base station to the apparatus.

Example 34. A method as in example 32, where the downlink control information comprises a bitmap that is indicative of the multiple grants.

Example 35. A method as in example 34, where a definition of the bitmap is commonly known to both the base station and the apparatus.

Example 36. A method as in example 24, further comprising sending to the base station information using the time-frequency resources in the at least one shared spectrum for one or more of the multiple grants.

Example 37. A method as in example 24, further comprising receiving from the base station a same information using the time-frequency resources in the at least one shared spectrum for each of the multiple grants on which the apparatus is able to receive.

Example 38. A method as in any one of examples 24 to 37, where the at least one shared spectrum comprises one or more unlicensed bands.

Example 39. A method as in any one of examples 24 to 38, where the at least one shared spectrum comprises one or more lightly-licensed bands.

Example 40. A method as in any one of examples 24 to 39, where the at least one shared spectrum comprises one or more licensed bands where usage in the one or more licensed bands is secondary.

Example 41. A method as in any one of examples 24 to 35 or 38 to 40, where attempting to communicate further comprises attempting to communicate in a device to device communication using the one or more of the multiple grants.

Example 42. An apparatus, comprising:

one or more processors; and one or more memories including computer program code, the one or more memories and the computer program code configured, with the one or more processors, to cause the apparatus to perform at least the following:

receiving, at an apparatus in a cell of a cellular communication network and from a base station serving the cell, indications of multiple grants, where each of the multiple grants comprises time-frequency resources in at least one shared spectrum that is to be used by the apparatus to attempt to communicate, where each of the multiple grants differs from others of the multiple grants in one or both of time or frequency; and attempting by the apparatus to communicate using one or more of the multiple grants.

Example 43. An apparatus, comprising:

means for receiving, at an apparatus in a cell of a cellular communication network and from a base station serving the cell, indications of multiple grants, where each of the multiple grants comprises time-frequency resources in at least one shared spectrum that is to be used by the apparatus to attempt to communicate, where each of the multiple grants differs from others of the multiple grants in one or both of time or frequency; and means for attempting by the apparatus to communicate using one or more of the multiple grants.

Example 44. An apparatus as in example 43, where the cellular communication network comprises a long term evolution of universal terrestrial radio access network.

Example 45. An apparatus as in any one of examples 43 or 44, where the apparatus comprises a user equipment.

Example 46. An apparatus as in any one of examples 43 to 45, where the base station comprises an evolved Node B.

Example 47. A base station having means adapted to execute the method of examples 1 to 18.

Example 48. An apparatus having means adapted to execute the method of examples 24 to 41.

Example 49. A cellular communication system comprising at least one base station according to example 47 and at least one apparatus according to example 48.

Example 50. A computer program comprising program code for executing the method according to any of examples 1 to 18 or 24 to 41.

Example 51. The computer program according to example 50, where the computer program is a computer program product comprising a computer-readable medium bearing computer program code embodied therein for use with a computer.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

While the exemplary embodiments have been described above in the context of the E-UTRAN (UTRAN-LTE, LTE) system, it should be appreciated that the exemplary embodiments of this invention are not limited for use with only this one particular type of wireless communication system, and that they may be used to advantage in other wireless communication systems.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controllers, other computing devices and/or some combination thereof The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as one or more integrated circuits, where the one or more integrated circuits may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the non-limiting and exemplary embodiments of this invention.

Furthermore, some of the features of the preferred embodiments of this invention could be used to advantage without the corresponding use of other features. As such, the foregoing description should be considered as merely illustrative of the principles, teachings and exemplary embodiments of this invention, and not in limitation thereof.

The following abbreviations are utilized herein:
3GPP third generation partnership project
AP access point
BS base station
BW bandwidth
CQI channel quality information
CTS clear to send
D2D device to device
DCI downlink control information
DL downlink (eNB towards UE)
DTX discontinuous transmission
eNB E-UTRAN Node B (evolved Node B)
EPC evolved packet core
E-UTRAN evolved UTRAN (LTE)
FDMA frequency division multiple access
HSPA high speed packet access
IEEE institute of electrical and electronics engineers
IMT-A international mobile telephony-advanced
IoT received power spectral density of the total noise and interference for a certain resource element (power integrated over the resource element and normalized to the subcarrier spacing) as measured at the UE antenna connector
ITU international telecommunication union
ITU-R ITU radiocommunication sector
LAN local area network
LTE long term evolution of UTRAN (E-UTRAN)
LTE-A LTE advanced
MAC medium access control (layer 2, L2)
MCS modulation and coding scheme
MM/MME mobility management/mobility management entity
Node B base station
NRA National Regulatory Authority
OFDMA orthogonal frequency division multiple access
O&M operations and maintenance
PBCH physical broadcast channel
PCC primary component channel
PDCCH physical downlink control channel PDCP packet data convergence protocol
PHY physical (layer 1, L1)
Rel release
RLC radio link control
RRC radio resource control
RRM radio resource management
RSRP reference signal received power
RSRQ reference signal received quality
RTS request to send
S GW serving gateway
SC FDMA single carrier, frequency division multiple access
SCC secondary component channel
SRS sounding reference signal
UE user equipment, such as a mobile station, mobile node or mobile terminal
UL uplink (UE towards eNB)
UTRAN universal terrestrial radio access network
Wi-Fi WLAN based on the IEEE 802.11 standard
WLAN wireless local area network

What is claimed is:

1. A method, comprising:
scheduling simultaneously, by a base station configured to service a cell within a cellular communication network, multiple grants to an apparatus in a coverage area of the cell, where each of the simultaneously scheduled multiple grants comprises time-frequency resources in at least one unlicensed spectrum that is to be used by the apparatus to attempt to communicate, where each of the simultaneously scheduled multiple grants differs from others of the simultaneously scheduled multiple grants in one or both of time or frequency; and
sending by the base station to the apparatus indications of the simultaneously scheduled multiple grants.

2. A method as in claim 1, where the multiple grants comprise one of the following:
multiple downlink grants; multiple uplink grants; at least one uplink grant and at least one downlink grant; multiple uplink grants and at least one downlink grant; or multiple uplink grants and multiple downlink grants.

3. A method as in claim 1, where the multiple grants comprise a first uplink grant and a second uplink grant, and where the second uplink grant is scheduled in response to the base station determining that a second base station is utilizing the time-frequency resources of the first uplink grant for communication with a second apparatus.

4. A method as in claim 1, where the multiple grants comprise a first grant and a second grant, and where the first grant is on a first unlicensed spectrum and the second grant is on a second unlicensed spectrum that is different from the first unlicensed spectrum.

5. A method as in claim 1, where the multiple grants comprise a first grant and a second grant, where the first grant and the second grant are on a same shared spectrum and differ in time.

6. A method as in claim 1, where the multiple grants comprise a first grant and a second grant, and where one of the following is true:
the first grant and the second grant differ in time resources;
the first grant and the second grant differ only in time resources;
the first grant and the second grant differ in frequency resources;
the first grant and the second grant differ only in frequency resources; and
the first grant and the second grant differ in both time resources and frequency resources.

7. A method as in claim 1, where the multiple grants are for at least one secondary component channel.

8. A method as in claim 1, where sending further comprises sending by the base station and to the apparatus indications of the simultaneously scheduled multiple grants on at least one downlink channel using at least one primary component channel.

9. A method as in claim 1, further comprising receiving by the base station and from the apparatus information using the time-frequency resources in the at least one unlicensed spectrum for one or more of the multiple grants.

10. A method as in claim 1, where the at least one unlicensed spectrum comprises one or more unlicensed bands.

11. A method as in claim 1, where the at least one unlicensed spectrum comprises one or more lightly-licensed bands.

12. A method as in claim 1, where the at least one unlicensed spectrum comprises one or more licensed bands where usage in the one or more licensed bands is secondary.

13. A method as in claim 1, where scheduling further comprises scheduling multiple grants to be used by the apparatus to communicate in a device to device communication with another apparatus.

14. A method, comprising:
receiving, at an apparatus in a cell of a cellular communication network and from a base station serving the cell, indications of multiple grants that are scheduled simultaneously by the base station, where each of the multiple grants comprises time-frequency resources in at least one unlicensed spectrum that is to be used by the apparatus to attempt to communicate, where each of the multiple grants differs from others of the multiple grants in one or both of time or frequency; and
attempting by the apparatus to communicate using one or more of the multiple grants.

15. A method as in claim 14, where receiving further comprises receiving control information from the base station, where the control information comprises information indicative of the multiple grants.

16. A method as in claim 15, where the control information comprises control information for one of uplink communication from the apparatus to the base station or downlink communication from the base station to the apparatus.

17. A method as in claim 15, where the downlink control information comprises a bitmap that is indicative of the multiple grants.

18. A method as in claim 17, where a definition of the bitmap is commonly known to both the base station and the apparatus.

19. A method as in claim 14, further comprising sending to the base station information using the time-frequency resources in the at least one unlicensed spectrum for one or more of the multiple grants.

20. A method as in claim 14, further comprising receiving from the base station a same information using the time-frequency resources in the at least one unlicensed spectrum for each of the multiple grants on which the apparatus is able to receive.

21. A method as in claim 14, where the at least one unlicensed spectrum comprises one or more unlicensed bands.

22. A method as in claim 14, where the at least one unlicensed spectrum comprises one or more lightly-licensed bands.

23. A method as in claim 14, where attempting to communicate further comprises attempting to communicate in a device to device communication using the one or more of the multiple grants.

24. An apparatus, comprising:
one or more processors; and
one or more memories including computer program code, the one or more memories and the computer program code configured, with the one or more processors, to cause the apparatus to perform at least the following:
scheduling simultaneously, by a base station configured to service a cell within a cellular communication network, multiple grants to an apparatus in a coverage area of the cell, where each of the simultaneously scheduled multiple grants comprises time-frequency resources in at least one shared spectrum that is to be used by the apparatus to attempt to communicate, where each of the simultaneously scheduled multiple grants differs from others of the simultaneously scheduled multiple grants in one or both of time or frequency; and
sending by the base station to the apparatus indications of the simultaneously scheduled multiple grants.

25. An apparatus, comprising:
one or more processors; and
one or more memories including computer program code, the one or more memories and the computer program code configured, with the one or more processors, to cause the apparatus to perform at least the following:
receiving, at an apparatus in a cell of a cellular communication network and from a base station serving the cell, indications of multiple grants that are scheduled simultaneously by the base station, where each of the multiple grants comprises time-frequency resources in at least one unlicensed spectrum that is to be used by the apparatus to attempt to communicate, where each of the multiple grants differs from others of the multiple grants in one or both of time or frequency; and
attempting by the apparatus to communicate using one or more of the multiple grants.

* * * * *